US012567598B2

(12) United States Patent
Liu et al.

(10) Patent No.: US 12,567,598 B2
(45) Date of Patent: Mar. 3, 2026

(54) PROTON EXCHANGE MEMBRANES FOR ELECTROCHEMICAL REACTIONS

(71) Applicant: UOP LLC, Des Plaines, IL (US)

(72) Inventors: Chunqing Liu, Arlington Heights, IL (US); Chaoyi Ba, Schaumburg, IL (US); Nicole Karns, Des Plaines, IL (US); Xueliang Dong, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 767 days.

(21) Appl. No.: 17/822,846

(22) Filed: Aug. 29, 2022

(65) Prior Publication Data

US 2023/0125657 A1 Apr. 27, 2023

Related U.S. Application Data

(60) Provisional application No. 63/262,905, filed on Oct. 22, 2021.

(51) Int. Cl.
*H01M 8/1039* (2016.01)
*C08G 65/40* (2006.01)
(Continued)

(52) U.S. Cl.
CPC ...... *H01M 8/1039* (2013.01); *C08G 65/4006* (2013.01); *C08G 65/48* (2013.01); *C08J 5/2256* (2013.01); *C08J 2371/10* (2013.01)

(58) Field of Classification Search
CPC ....... H01M 8/1039; H01M 2008/1095; H01M 2300/0082; H01M 8/1023; H01M 8/1025;
(Continued)

(56) References Cited

U.S. PATENT DOCUMENTS

| | | |
|---|---|---|
| 4,931,182 A | 6/1990 | Burgoyne, Jr. et al. |
| 7,485,173 B1 | 2/2009 | Liu et al. |

(Continued)

FOREIGN PATENT DOCUMENTS

| | | |
|---|---|---|
| CN | 104425829 A | 3/2015 |
| CN | 104829814 A | 8/2015 |

(Continued)

OTHER PUBLICATIONS

Ryu et al., "Synthesis and characterization of block copolymer and comparative study with random copolymer via superacid-catalyzed reaction, "International Journal of Hydrogen Energy, vol. 43, Issue 26, Jun. 28, 2018, pp. 11862-11871.*

(Continued)

*Primary Examiner* — Helen Oi K Conley

(57) ABSTRACT

A proton-conducting polymer comprises a plurality of repeating units of formula (I) for electrochemical reactions. The polymer may be synthesized from a super acid catalyzed polyhydroxyalkylation reaction of monomers $Ar_1'$, $Ar_2'$, and $X_1'$ followed by a nucleophilic substitution reaction or a grafting reaction, and optionally an acidification reaction.

(I)

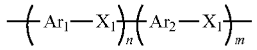

Proton-exchange membranes and membrane electrode assemblies made from the polymer are also described.

19 Claims, 2 Drawing Sheets

(51) Int. Cl.
*C08G 65/48* (2006.01)
*C08J 5/22* (2006.01)

(58) Field of Classification Search
CPC .. H01M 8/1027; H01M 8/103; H01M 8/1032; C08G 65/4006; C08G 65/48; C08G 8/02; C08G 10/00; C08G 14/00; C08G 2261/42; C08G 61/00; C08G 73/0672; C08J 5/2256; C08J 2371/10; C08J 2365/00; C08J 2379/04; C08L 61/34; Y02E 60/36; Y02E 60/50; Y02P 20/133
See application file for complete search history.

(56) References Cited

U.S. PATENT DOCUMENTS

| | | | |
|---|---|---|---|
| 9,580,824 | B2 | 2/2017 | Masel et al. |
| 10,370,483 | B2 | 8/2019 | Kim et al. |
| 10,435,504 | B2 | 10/2019 | Bae et al. |
| 2005/0268783 | A1 | 12/2005 | Koros et al. |
| 2009/0178561 | A1 | 7/2009 | Miller et al. |
| 2009/0182097 | A1 | 7/2009 | Miller et al. |
| 2020/0308341 | A1 | 10/2020 | Yan et al. |
| 2021/0009726 | A1 | 1/2021 | Yan et al. |

FOREIGN PATENT DOCUMENTS

| | | | |
|---|---|---|---|
| CN | 109320692 | A | 2/2019 |
| CN | 109384908 | A | 2/2019 |
| CN | 110862516 | A | 3/2020 |
| CN | 110903449 | A | 3/2020 |
| CN | 111303360 | A | 6/2020 |
| CN | 112175170 | A | 1/2021 |
| CN | 112175217 | A | 1/2021 |
| CN | 113583279 | A | 11/2021 |
| CN | 113956445 | A | 1/2022 |
| JP | 2016218140 | A | 12/2016 |
| KR | 101546651 | B1 | 8/2015 |
| KR | 20210071810 | A | 6/2021 |
| WO | 2017190234 | A1 | 11/2017 |
| WO | 2019068051 | A2 | 4/2019 |
| WO | 2019076860 | A1 | 4/2019 |
| WO | 2021172706 | A1 | 9/2021 |

OTHER PUBLICATIONS

Lim et al., "Synthesis and characterization of pendant propane sulfonic acid on phenylene based copolymers by superacid-catalyzed reaction," Renewable Energy, vol. 79, Jul. 2015, pp. 85-90.*

Taewook Ryu et al., Synthesis and characterization of block copolymer and comparative study with random copolymer via superacide-catalyzed reaction, International Journal of Hydrogen Energy 43, (2018), 11862-11871.

Lillain I. Olvera et al., High thermomechanical stability and ion-conductivity of anion exchange membranes based on quaternized modified poly(oxyndoleterphenylene), Polymer Testing 95, 2021, 107092.

Soonho Lee et al., Synthesis and properties of sulfonated poly(N-methylisatin-biphenylene) proton exchange membrane by superacide-catalyzed polymerization, International Journal of Hydrogen Energy, 40, (2015), 5390-5395.

Extended European Search report from corresponding European application No. 22884615.0, dated Jul. 10, 2025.

Zhiyang Zhu et al., One-step synthesis of hdroxyl-functionalized fully carbon main chain PIMs via a Friedel-Crafts reaction for efficient gas separation, Separation and Purification Technology, 262, 2021, 118313.

International Search Report from PCT application No. PCT/US2023/082688, mailed Apr. 12, 2024.

Written Opinion from PCT application No. PCT/US2023/082688, mailed Apr. 12, 2024.

International Preliminary Report on Patentability from PCT application No. PCT/US2022/076294, issued Mar. 5, 2024.

M. Carmen et al., Novel, Metal-Free, Superacid-Catalyzed "Click" Reactions of Isatins with Linear, Nonactivated, Multiring Aromatic Hydrocarbons, Macromolecules, 2010, 43, 6968-6979.

Extended European Search Report from European application No. 22884614.3 dated Jul. 17, 2025.

International Search Report from PCT application No. PCT/US2023/073078, mailed Dec. 18, 2023.

Written Opinion from PCT application No. PCT/US2023/073078, mailed Dec. 18, 2023.

International Search Report from PCT application No. PCT/US2023/021186, mailed Aug. 28, 2023.

Written Opinion from PCT application No. PCT/US2023/021186, mailed Aug. 28, 2023.

International Search Report from corresponding PCT application No. PCT/IB2022/078207, mailed Feb. 1, 2023.

Written Opinion from corresponding PCT application No. PCT/IB2022/078207, completed Jan. 31, 2023.

Ryu, T. et al., Synthethis and characterization of block copolymer and comparative study with random copolymer via superacid-catalyzed reaction, International journal of hydrogen energy, 2018, vol. 43, pp. 11862-11871. NEED.

Lee, S. et al., Synthesis and properties of sulfonated poly(N-methylisatin-biphenylene) proton exchange membrane by superacid-catalyzed polymerization, International journal of hydrogen energy, 2015, vol. 40, pp. 5390-5395. NEED.

International Search Report from PCT application No. PCT/IB2022/078205, mailed Feb. 10, 2023.

Written Opinion from PCT application No. PCT/IB2022/078205, completed Feb. 10, 2023.

Wang, Junhua et al., Poly(arly piperidinium) membranes and ionomers for hydroxide exchange membrane fuel cells, Nature Energy, https://doi.org/10.1038/s41560-019-0372-8.

Ye Liu et al., Chemical cross-linking modification of polyimide membranes for gas separation, Journal of Membrane Science 189 (2001) 231-239.

Chien-Chiang Chen et al., Plasticization-resistant hollow fiber membranes for CO2/CH4 separation based on a thermally crosslinkable polyimide, Journal of Membrane Science 382 (2011) 212-221.

Liu, Chunqing et al., U.S. Appl. No. 17/388,950, filed Jul. 29, 2021, entitled Ionically Conductive Asymmetric Composite Membranes for Electrochemical Energy Storage Applications.

Liu, Chunqing et al., U.S. Appl. No. 17/388,956, filed Jul. 29, 2021, entitled Sandwich-Structured Thin Film Composite Anion Exchange Membrane for Redox Battery Applications.

Liu, Chunqing et al., U.S. Appl. No. 17/389,032, filed Jul. 29, 2021, entitled Ionically Conductive Thin Film Composite Membranes for Energy Storage Applications.

Liu, Chunqing et al., U.S. Appl. No. 17/388,962, filed Jul. 29, 2021, entitled Electrolyte Compositions for Redox Flow Batteries.

Ba, Chaoyi, et al., U.S. Appl. No. 17/474,198, filed Sep. 14, 2021, entitled Anion Exchange Polymers and Membranes for Electroylsis.

* cited by examiner

PI2BPPT

PI2BPPT-$SO_3$Na

PI2BPPT-$SO_3$H

PROTON EXCHANGE MEMBRANES FOR ELECTROCHEMICAL REACTIONS

RELATED APPLICATIONS

This application claims priority to U.S. Provisional Patent Application Ser. No. 63/262,905, filed on Oct. 22, 2021, the entirety of which is incorporated herein by reference.

BACKGROUND OF THE INVENTION

Hydrogen as an energy vector for grid balancing or power-to-gas and power-to-liquid processes plays an important role in the path toward a low-carbon energy structure that is environmentally friendly. Water electrolysis produces high quality hydrogen by electrochemical splitting of water into hydrogen and oxygen; the reaction is given by Eq. 1 below. The water electrolysis process is an endothermic process, and electricity is the energy source. Water electrolysis has zero carbon footprint when the process is operated by renewable power sources, such as wind, solar, or geothermal energy. The main water electrolysis technologies include alkaline electrolysis, proton exchange membrane (PEM) water electrolysis (PEMWE) as shown in FIG. 1, anion exchange membrane (AEM) water electrolysis, and solid oxide water electrolysis.

As shown in FIG. 1, in a PEMWE system 100, an anode 105 and a cathode 110 are separated by a solid PEM electrolyte 115, such as a sulfonated tetrafluoroethylene based cofluoropolymer sold under the trademark Nafion® by Chemours company. The anode and cathode catalysts typically comprise IrO2 and Pt, respectively. At the positively charged anode 105, pure water 120 is oxidized to produce oxygen gas 125, electrons (e−), and protons; the reaction is given by Eq. 2. The protons are transported from the anode 105 to the cathode 110 through the PEM 115 that conducts protons. At the negatively charged cathode 110, a reduction reaction takes place with electrons from the cathode 110 being given to protons to form hydrogen gas 130; the reaction is given by Eq. 3. The PEM 115 not only conducts protons from the anode 105 to the cathode 110, but also separates the H2 gas 130 and O2 gas 125 produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (20-90° C.) operation, and high purity oxygen byproduct. However, one of the major challenges for PEM water electrolysis is the high capital cost of the cell stack comprising expensive acid-tolerant stack hardware such as the Pt-coated Ti bipolar plates, expensive noble metal catalysts required for the electrodes, as well as the expensive PEM.

Water electrolysis reaction: $2H_2O \rightarrow 2H_2 + O_2$ (1)

Oxidation reaction at anode for PEMWE: $2H_2O \rightarrow O_2 + 4H^+ + 4e^-$ (2)

Reduction reaction at cathode for PEMWE: $2H^+ + 2e^- \rightarrow H_2$ (3)

Fuel cells, as a next generation clean energy resource, convert the energy of chemical reactions such as an oxidation/reduction redox reaction of hydrogen and oxygen into electric energy. The three main types of fuel cells are alkaline electrolyte fuel cells, polymer electrolyte membrane fuel cells, and solid oxide fuel cells. Polymer electrolyte membrane fuel cells may include proton exchange membrane fuel cells (PEMFC), anion exchange membrane fuel cells (AEMFC), and direct methanol fuel cells. PEMFC uses a PEM to conduct protons from the anode to the cathode, and it also separates the $H_2$ and $O_2$ gases to prevent gas crossover. AEMFC uses an AEM to conduct $OH^-$ from the cathode to the anode, and it also separates the $H_2$ and $O_2$ gases to prevent gas crossover.

The anode in an electrochemical cell is the electrode at which the predominant reaction is oxidation (e.g., the water oxidation/oxygen evolution reaction electrode for a water electrolyzer, or the hydrogen oxidation electrode for a fuel cell). The cathode in an electrochemical cell is the electrode at which the predominant reaction is reduction (e.g., the proton reduction/hydrogen evolution reaction electrode for a water electrolyzer, or the oxygen reduction electrode for a fuel cell).

Significant advances are needed in cost-effective, high performance, stable catalysts, membrane materials, as well as other cell stack components for electrolysis and fuel cells with a wide range of applications in renewable energy systems.

Redox flow batteries (RFBs) comprise two external storage tanks filled with active materials comprising metal ions that may be in different valance states, two circulation pumps, and a flow cell with a separation membrane and two electrodes. The separation membrane is located between the anode and the cathode and is used to separate the anolyte and the catholyte, as well as to utilize the current circuit by allowing the transfer of balancing ions. The anolyte, catholyte, anode, and cathode may also be referred to as plating electrolyte or negative electrolyte, redox electrolyte or positive electrolyte, plating electrode or negative electrode, and redox electrode or positive electrode respectively. Among all the redox flow batteries developed to date, all vanadium redox flow batteries (VRFB) have been the most extensively studied. VRFB uses the same vanadium element in both half cells which prevents crossover contamination of electrolytes from one half cell to the other half cell. VRFB, however, is inherently expensive due to the use of high-cost vanadium and an expensive membrane. All-iron redox flow batteries (IFB) are particularly attractive for grid scale storage applications due to the use of low cost and abundantly available iron, salt, and water as the electrolyte and the non-toxic nature of the system. IFBs have iron in different valence states as both the positive and negative electrolytes for the positive and negative electrodes, respectively. The iron-based positive and negative electrolyte solutions stored in the external storage tanks flow through the stacks of the batteries. The cathode side half-cell reaction involves $Fe^{2+}$ losing electrons to form $Fe^{3+}$ during charge and $Fe^{3+}$ gaining electrons to form $Fe^{2+}$ during discharge; the reaction is given by Eq. 4. The anode side half-cell reaction involves the deposition and dissolution of iron in the form of a solid plate; the reaction is given by Eq. 5. The overall reaction is shown in Eq. 6.

Redox electrode: $2Fe^{2+} \leftrightarrow Fe^{3+} + 2e^- + 0.77V$ (4)

Plating electrode: $Fe^{2+} + 2e^- \leftrightarrow Fe^0 - 0.44V$ (5)

Total: $3Fe^{2+} \leftrightarrow Fe^0 + 2Fe^{3+} 1.21V$ (6)

The membrane is one of the materials that make up a battery or electrolysis cell and is an important driver for safety and performance. Some important properties for membranes for flow batteries, fuel cells, and membrane electrolysis include high conductivity, high ionic permeability (porosity, pore size and pore size distribution), high ionic exchange capacity (for ion-exchange membrane), high ionic/electrolyte selectivity (low permeability/crossover to electrolytes), low price (less than \$150-200/$m^2$), low area resistance to minimize efficiency loss resulting from ohmic polarization, high resistance to oxidizing and reducing conditions, chemically inert to a wide pH range, high thermal stability together with high proton conductivity (greater than or equal to 120° C. for fuel cell), high proton conductivity at high temperature without $H_2O$, high proton conductivity at high temperature with maintained high relative humidity, and high mechanical strength (thickness, low swelling).

The membrane is ionically conductive. The ionic conductivity means that the membrane can transport the charge-carrying ions, such as protons or ammonium ion ($NH_4^+$), from one side of the membrane to the other side of the membrane to maintain the electric circuit. The electrical balance is achieved by the transport of charge-carrying ions (such as protons, ammonium ions, potassium ions, or sodium ions in all iron redox flow battery system) in the electrolytes across the membrane during the operation of the battery cell. The ionic conductivity ($\sigma$) of the membrane is a measure of its ability to conduct charge-carrying ions, and the measurement unit for conductivity is Siemens per meter (S/m). The ionic conductivity ($\sigma$) of the ionically conductive membrane is measured by determining the resistance (R) of the membrane between two electrodes separated by a fixed distance. The resistance is determined by electrochemical impedance spectroscopy (EIS) and the measurement unit for the resistance is Ohm ($\Omega$). The membrane area specific resistance (RA) is the product of the resistance of the membrane (R) and the membrane active area (A) and the measurement unit for the membrane area specific resistance is $\Omega \cdot cm^2$. The membrane ionic conductivity ($\sigma$, S/cm) is proportional to the membrane thickness (L, cm) and inversely proportional to the membrane area specific resistance (RA, $\Omega \cdot cm^2$).

The performance of the RFB is evaluated by several parameters including area specific resistance, numbers of battery charge/discharge cycling, electrolyte crossover through the membrane, voltage efficiency (VE), coulombic efficiency (CE), and energy efficiency (EE) of the RFB cell. CE is the ratio of a cell's discharge capacity divided by its charge capacity. A higher CE, indicating a lower capacity loss, is mainly due to the lower rate of crossover of electrolyte ions, such as ferric and ferrous ions, through the membrane and reduced $H_2$ evolution reaction during charging in the iron redox flow battery system. VE is defined as the ratio of a cell's mean discharge voltage divided by its mean charge voltage (See M. Skyllas-Kazacos, C. Menictas, and T. Lim, Chapter 12 on Redox Flow Batteries for Medium- to Large-Scale Energy Storage in *Electricity Transmission, Distribution and Storage Systems*, A volume in Woodhead Publishing Series in Energy, 2013). A higher VE, indicating a higher ionic conductivity, is mainly due to the low area specific resistance of the battery system. EE is the product of VE and CE and is an indicator of energy loss in charge-discharge processes. EE is an important parameter to evaluate an energy storage system.

One issue for the current all iron RFB system is the high area specific resistance that results in low VE. The area specific resistance is the combination of the resistances from the membrane, the current collectors, the end plates, the electrolytes, the reactions, the interfacial resistance, and other components. Another issue is the loss of capacity in all iron RFB due to the undesired crossover of water and Fe ions through the membrane. Yet another issue is the $H_2$ evolution reaction during charging. $H_2$ is formed on the negative side of the battery as $Fe^{2+}$ is plated on the electrode as $Fe^0$, which will result in low CE. As battery is charging, hydrogen is formed on the negative side of the battery as $Fe^{2+}$ is plated on the electrode as $Fe^0$. Meanwhile, losses are minimal on positive side. Therefore, there is more $Fe^{3+}$ in the positive solution for each cycle until there is no more $Fe^{2+}$ available for charging the battery. The formation of $H_2$ resulted in low CE.

Therefore, there is a need for improved membranes for use in RFB systems, and for methods of making them.

DESCRIPTION OF THE INVENTION

Figure 1:
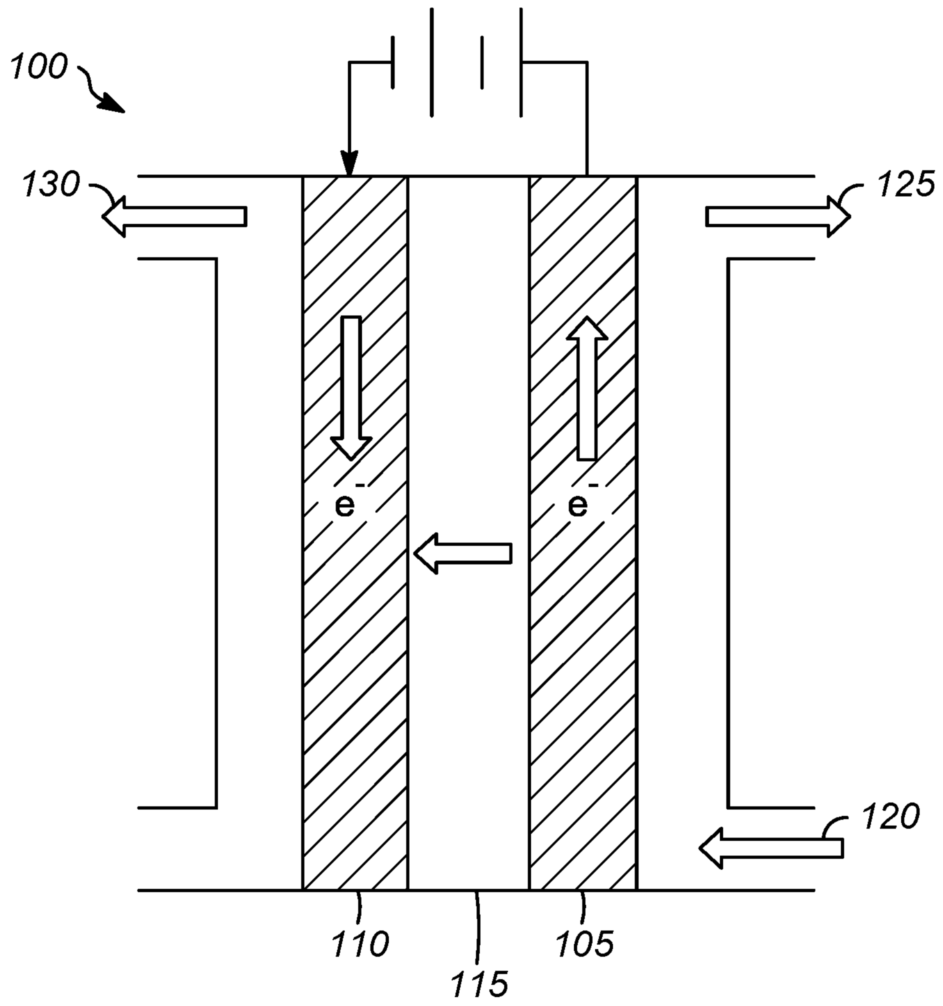
FIG. 1 is an illustration of one embodiment of a PEMWE cell.

This invention discloses a novel proton-exchange membrane (PEM) comprising a novel proton-conducting polymer for electrochemical reactions, such as electrolysis, fuel cell, and redox flow batteries. Particularly, this invention discloses a novel proton-conducting polymer comprising a plurality of repeating units of formula (I), and a PEM prepared from the proton-conducting polymer.

The proton-exchange membrane comprising the proton-conducting polymer comprising a plurality of repeating units of formula (I) has lower membrane area specific resistance and significantly reduced electrolyte crossover from the positive electrolyte solution to the negative electrolyte solution, and therefore improved VE, EE, reduced maintenance cost, and improved deliverable capacity for redox flow battery applications compared to a commercially available membrane, such as a Nafion 115 membrane.

$$-(Ar_1-X_1)_n-(Ar_2-X_1)_m- \quad (I)$$

wherein one or more of $Ar_1$, $Ar_2$, and $X_1$ comprises an acid functional group, wherein the acid functional group comprises —$SO_3^-Z^+$, —$COO^-Z^+$, or —$PO_3H^-Z^+$, and wherein $Z^+$ is $H^+$, a metal cation, a quaternary ammonium cation, or mixtures thereof;

wherein $Ar_1$ is selected from the group consisting of:

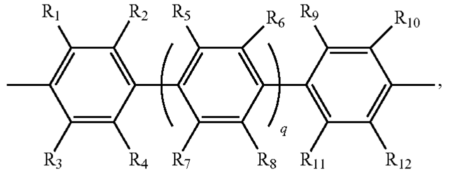

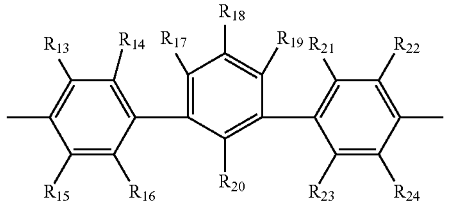

-continued
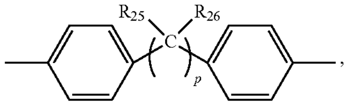
,
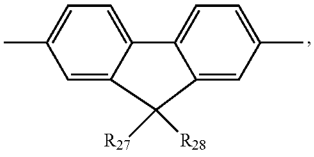
,
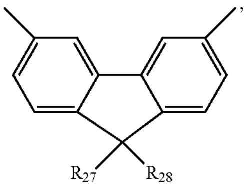
,
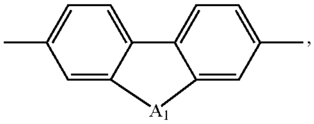
,
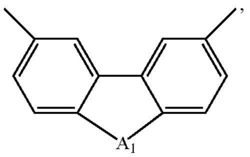
,
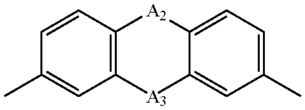
and mixtures thereof;
wherein $Ar_2$ is selected from the group consisting of:
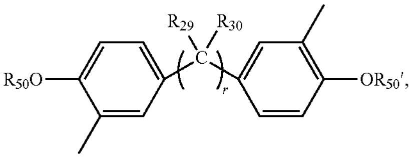
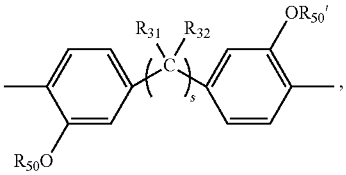
,
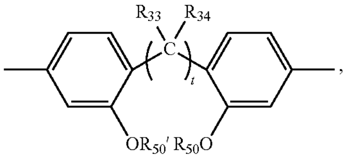
,
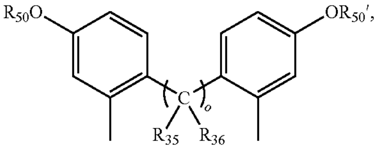
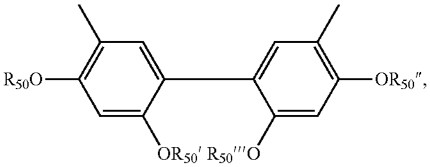
-continued
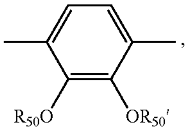
,
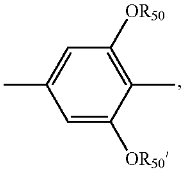
,
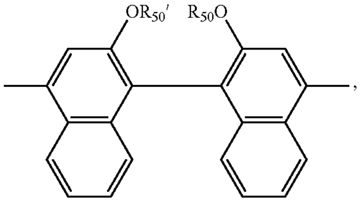
,
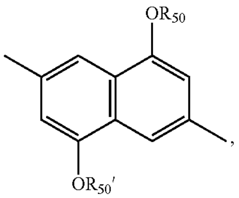
,
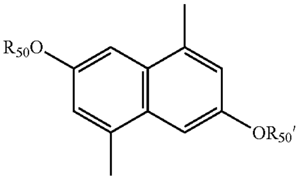
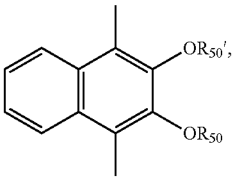
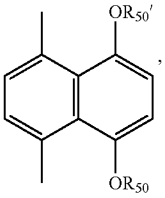
,
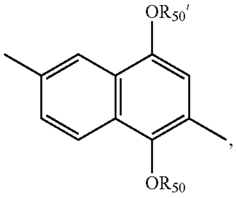
,
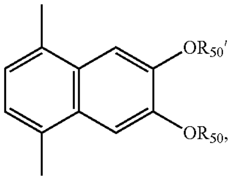
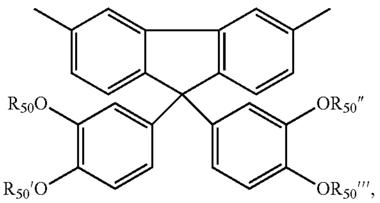
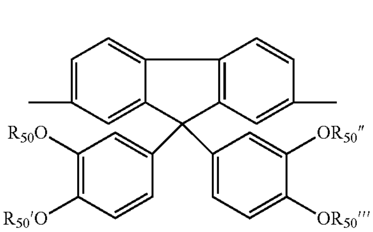

and mixtures thereof; and wherein $X_1$ is selected from the group consisting of:

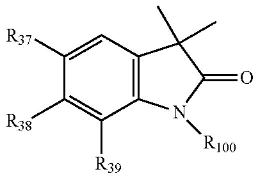

or a mixture of

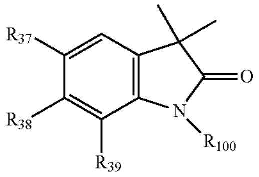

and one or more of:

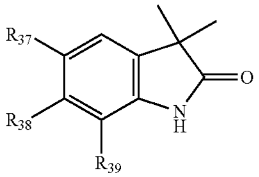 and 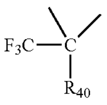

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is $—SO_3^-Z_1^+$, $—COO^-Z_1^+$, or $—PO_3H^-Z_1^+$, and wherein $Z_1^+$ is $H^+$, a metal cation, a quaternary ammonium cation, or mixtures thereof;

wherein $R_{37}$-$R_{39}$ are each independently hydrogen, a halogen, a nitro group, an alkyl group, an alkenyl group, an alkynyl group, an aryl group, or an alkoxy group, and wherein the alkyl group, the alkenyl group, the alkynyl group, or the aryl group is optionally substituted with a halogen, an acid functional group, or the halogen and the acid functional group, and wherein the acid functional group is $—SO_3^-Z_2^+$, $—COO^-Z_2^+$, or $—PO_3H^-Z_2^+$, and wherein $Z_2^+$ is $H^+$, a metal cation, a quaternary ammonium cation, or mixtures thereof;

wherein $R_{40}$ is an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is $—SO_3^-Z_3^+$, $—COO^-Z_3^+$, or $—PO_3H^-Z_3^+$, and wherein $Z_3^+$ is $H^+$, a metal cation, a quaternary ammonium cation, or mixtures thereof;

wherein $R_{50}$, $R_{50}'$, $R_{50}''$, and $R_{50}'''$ are each independently hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group are substituted with an acid functional group or are substituted with a halogen and the acid functional group; wherein the acid functional group is $—SO_3^-Z_4^+$, $—COO^-Z_4^+$, or $—PO_3H^-Z_4^+$, and wherein $Z_4^+$ is $H^+$, a metal cation, a quaternary ammonium cation, or mixtures thereof; with the proviso that one or more of $R_{50}$ and $R_{50}'$ is not hydrogen, or one or more of $R_{50}$, $R_{50}'$, $R_{50}''$, and $R_{50}'''$ is not hydrogen;

wherein $R_{100}$ is independently a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group; wherein the acid functional group is $—SO_3^-Z_4^+$, $—COO^-Z_4^+$, or $—PO_3H^-Z_4^+$, and wherein $Z_4^+$ is $H^+$, a metal cation, a quaternary ammonium cation, or mixtures thereof;

wherein the halogen is F, Cl, Br, or I;

wherein $A_1$, $A_2$, and $A_3$ are each independently O, S, or $N—R_{200}$ and wherein $R_{200}$ is hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group; wherein the acid functional group is $—SO_3^-Z_4^+$, $—COO^-Z_4^+$, or $—PO_3H^-Z_4^+$, and wherein $Z_4^+$ is $H^+$, a metal cation, a quaternary ammonium cation, or mixtures thereof;

wherein p is 1, 2, 3, or 4;

wherein q is 0, 1, 2, or 3;

wherein r, s, t, and o are independently 0, 1, 2, 3, 4, 5, or 6;

wherein n is an integer from 0 to 5000;

wherein m is an integer from 5 to 5000; and wherein a molar ratio of n/m is in a range of 0:1 to 20:1.

In some embodiments, $Ar_1$ is selected from the group consisting of

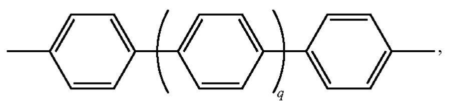

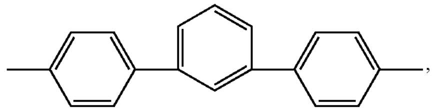

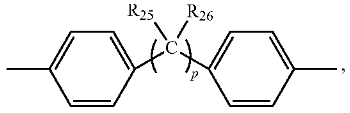

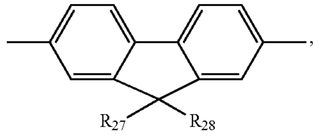

-continued
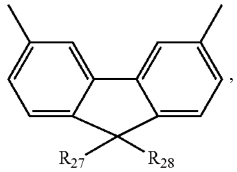
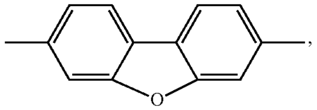
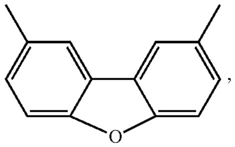
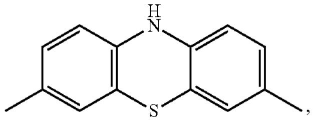
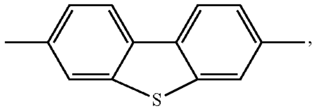
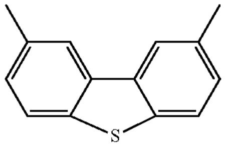
and mixtures thereof,
wherein $R_{25}$, $R_{26}$, $R_{27}$, and $R_{28}$ are each independently —H or —$CH_3$;
wherein p is 1 or 2; and
wherein q is 0 or 1.
In some embodiments, $Ar_2$ is selected from the group consisting of
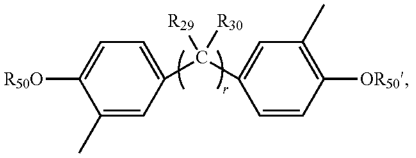
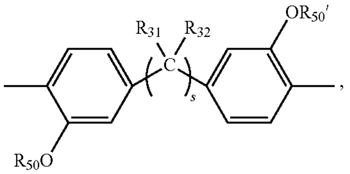
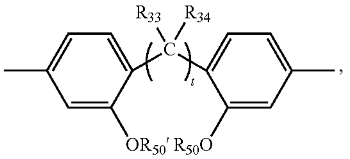
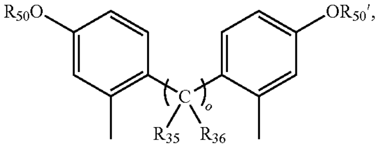
-continued
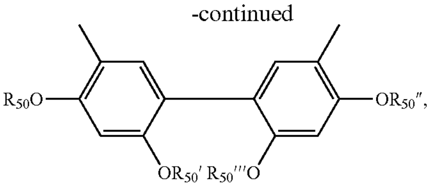
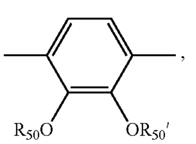
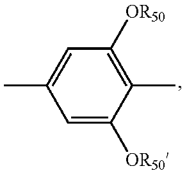
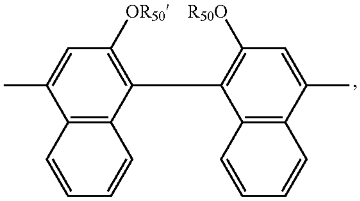
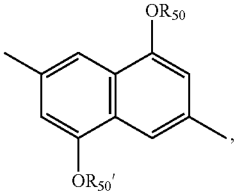
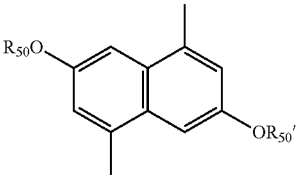
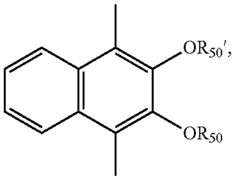
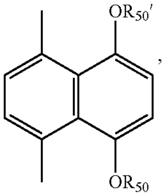
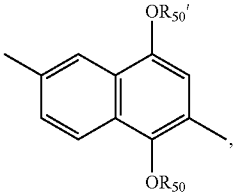
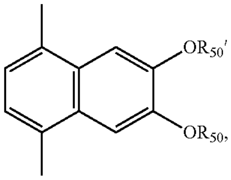
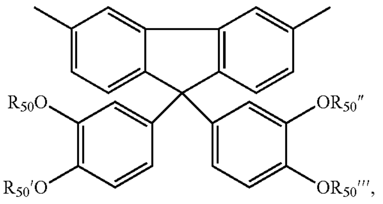
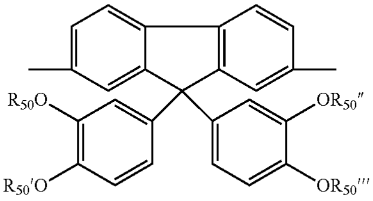

and mixtures thereof;

wherein $R_{29}$-$R_{36}$ are each independently —$CH_3$ or —$CF_3$;

wherein $R_{50}$, $R_{50}$', $R_{50}$'', and $R_{50}$''' are each independently hydrogen or —$(CH_2)_3SO_3^-Z_4^+$ and wherein $Z_4^+$ is $H^+$, a metal cation, a quaternary ammonium cation, or mixtures thereof, with the proviso that one or more of $R_{50}$ and $R_{50}$' is not hydrogen, or one or more of $R_{50}$, $R_{50}$', $R_{50}$'', and $R_{50}$' is not hydrogen; and wherein r, s, t, and o are each independently 0 or 1.

In some embodiments, $X_1$ is

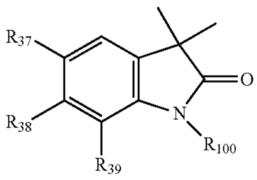

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{100}$ is —$(CH_2)_3SO_3^-Z_4^+$ and wherein $Z_4^+$ is $H^+$, a metal cation, a quaternary ammonium cation, or mixtures thereof.

In some embodiments, $X_1$ is a mixture of

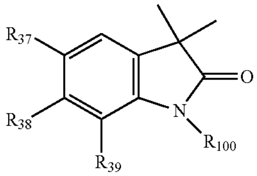

and

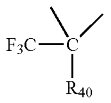

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$;

wherein $R_{40}$ is —$CH_3$, —$CH_2CH_3$, or —$C_6H_5$; and wherein $R_{100}$ is —$(CH_2)_3SO_3^-Z_4^+$ and wherein $Z_4^+$ is $H^+$, a metal cation, a quaternary ammonium cation, or mixtures thereof.

In some embodiments, $X_1$ is a mixture of

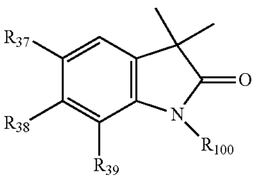

and

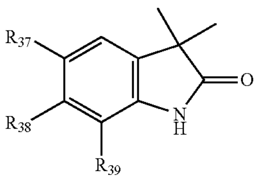

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{100}$ is —$(CH_2)_3SO_3^-Z_4^+$ and wherein $Z_4^+$ is $H^+$, a metal cation, a quaternary ammonium cation, or mixtures thereof.

In some embodiments, $X_1$ is a mixture of

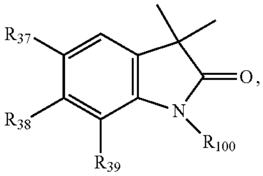

,

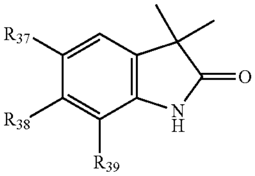

and

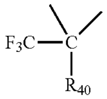

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$;

wherein $R_{40}$ is —$CH_3$, —$CH_2CH_3$, or —$C_6H_5$; and wherein $R_{100}$ is —$(CH_2)_3SO_3^-Z_4^+$ and wherein $Z_4^+$ is $H^+$, a metal cation, a quaternary ammonium cation, or mixtures thereof.

In some embodiments, $Ar_1$ is selected from the group consisting of

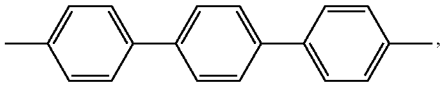

,

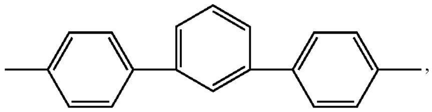

,

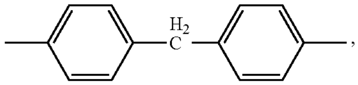

,

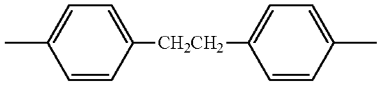

and mixtures thereof.

In some embodiments, $Ar_2$ is selected from the group consisting of:

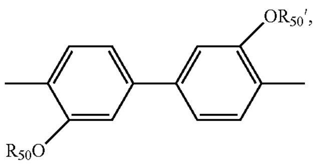

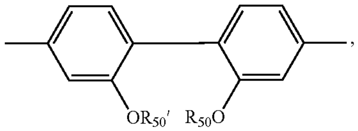

,

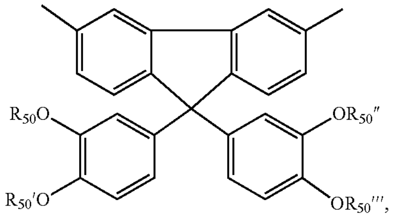

-continued

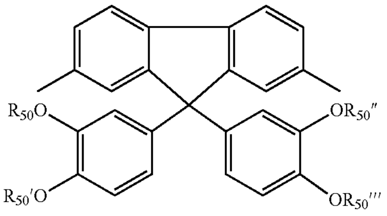

and mixtures thereof;

wherein $R_{50}$, $R_{50}'$, $R_{50}''$, and $R_{50}'''$ are each independently hydrogen or $-(CH_2)_3SO_3^-Z_4^+$ and wherein $Z_4^+$ is $H^+$, $Na^+$, $K^+$, $NH_4^+$, or mixtures thereof, with the proviso that one or more of $R_{50}$ and $R_{50}'$ is not hydrogen, or one or more of $R_{50}$, $R_{50}'$, $R_{50}''$, and $R_{50}'''$ is not hydrogen.

In some embodiments, $X_1$ is

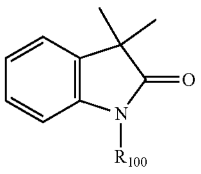

or a mixture of

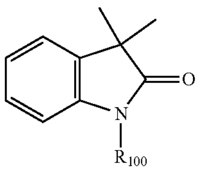

and one or more of:

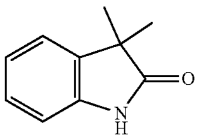

and

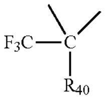

wherein $R_{100}$ is $-(CH_2)_3SO_3^-Z_4^+$ and wherein $Z_4^+$ is $H^+$, $Na^+$, $K^+$, $NH_4^+$, or mixtures thereof, and wherein $R_{40}$ is $-CH_3$, $-CH_2CH_3$, or $-C_6H_5$.

The proton-conducting polymer may be synthesized from a super acid catalyzed polyhydroxyalkylation reaction of monomers $Ar_1'$, $Ar_2'$, and $X_1'$, followed by a nucleophilic substitution reaction or a grafting reaction, and optionally an acidification reaction.

The polymer comprises the reaction product of:

reacting monomers $Ar_1'$, $Ar_2'$, and $X_1'$ via a polyhydroxyalkylation reaction in the presence of a super acid catalyst to synthesize a precursor polymer comprising a plurality of repeating units of formula (II) having phenolic hydroxyl functional groups:

$$-(Ar_1-X_1'')_{n'}(Ar_2''-X_1'')_{m'}- ;\quad \text{(II)}$$

wherein $Ar_1'$ is selected from the group consisting of:

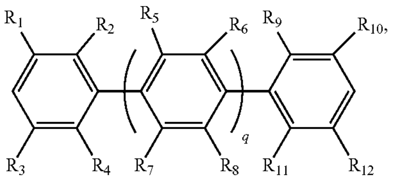

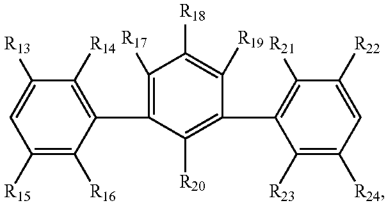

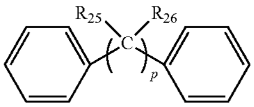

,

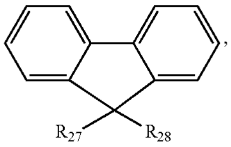

,

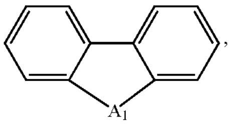

,

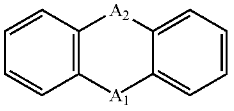

and mixtures thereof;

wherein $Ar_2'$ is selected from the group consisting of:

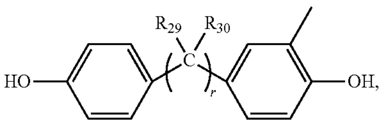

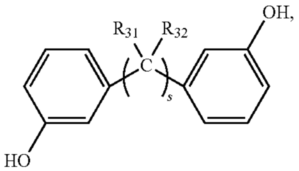

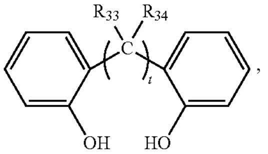

,

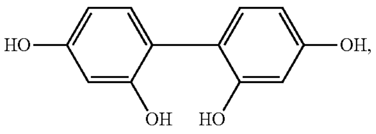

-continued
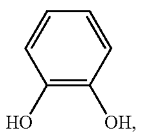
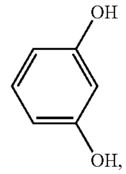
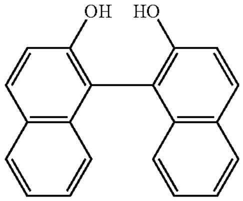
,
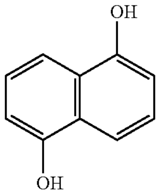
,
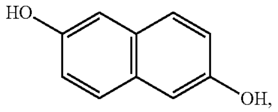
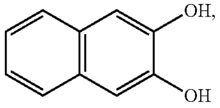
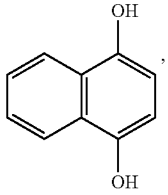
,
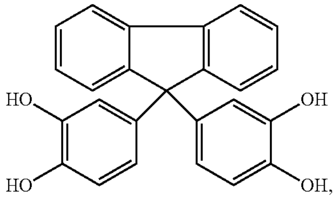
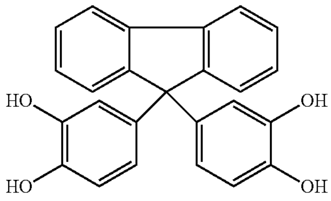
and mixtures thereof;
wherein $X_1$' is selected from the group consisting essentially of:
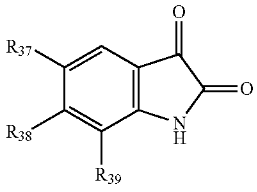
or a mixture of
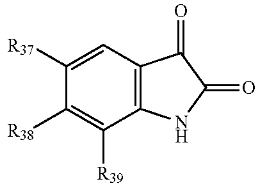
and
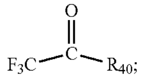
wherein $Ar_1$ is selected from the group consisting of:
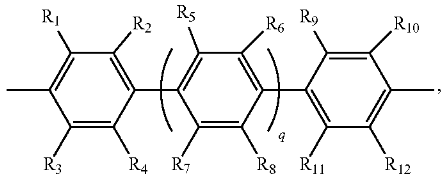
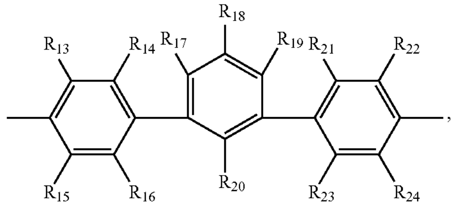
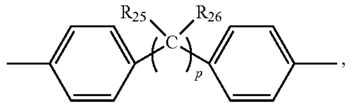
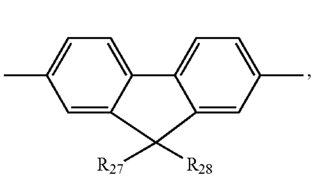
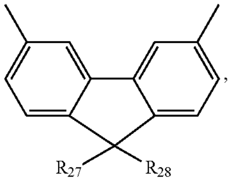
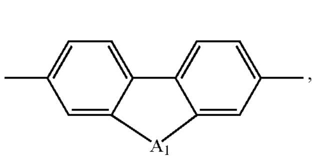
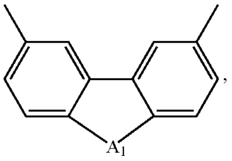
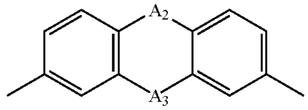
and mixtures thereof;
wherein $Ar_2$" is selected from the group consisting of:
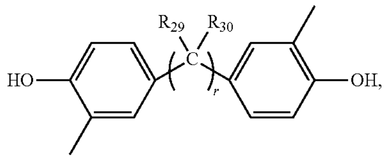
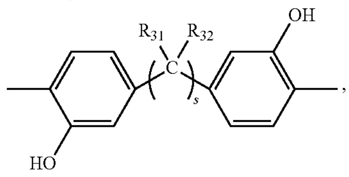

-continued

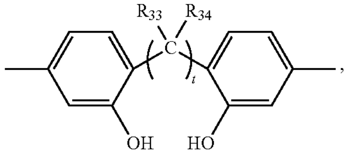

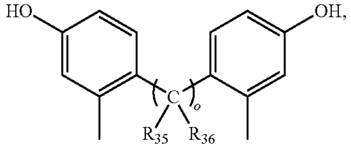

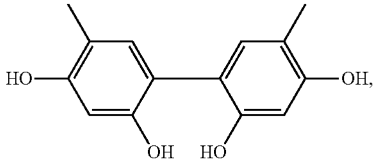

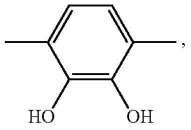

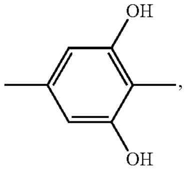

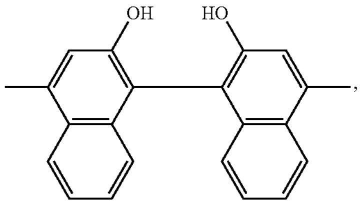

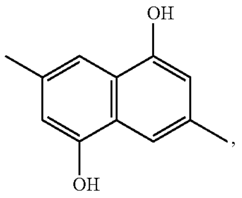

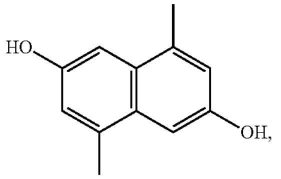

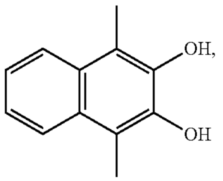

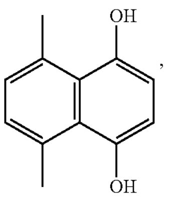

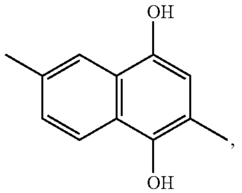

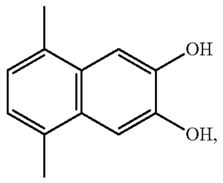

-continued

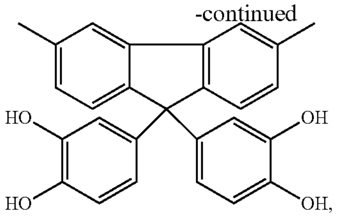

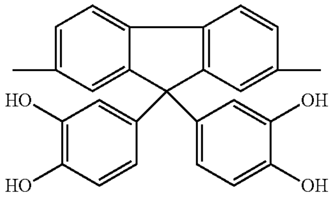

and mixtures thereof;

wherein $X_1$" is selected from the group consisting of:

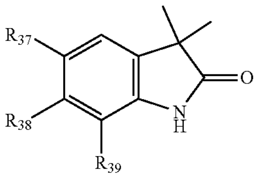

or a mixture of

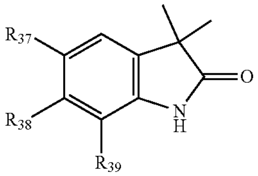 and 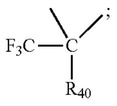

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen, an acid functional group, or both the halogen and the acid functional group, and wherein the acid functional group is —$SO_3^-Z_1$, —$COO^-Z_1$, or —$PO_3H^-Z_1^+$, and wherein $Z_1^+$ is $H^+$, a metal cation, a quaternary ammonium cation, or mixtures thereof;

wherein $R_{37}$-$R_{39}$ are each independently hydrogen, a halogen, a nitro group, an alkyl group, an alkenyl group, an alkynyl group, an aryl group, or an alkoxy group, and wherein the alkyl group, the alkenyl group, the alkynyl group, or the aryl group is optionally substituted with a halogen, an acid functional group, or both the halogen and the acid functional group, and wherein the acid functional group is —$SO_3^-Z_2^+$, —$COO^-Z_2^+$, or —$PO_3H^-Z_2^+$, and wherein $Z_2^+$ is $H^+$, a metal cation, a quaternary ammonium cation, or mixtures thereof;

wherein $R_{40}$ is an alkyl group, an alkenyl group, an alkynyl group, or an aryl group, and wherein the alkyl group, the alkenyl group, the alkynyl group, or the aryl group is optionally substituted with a halogen, an acid functional group, or both the halogen and the acid functional group, and wherein the acid functional group is $-SO_3^-Z_3^+$, $-COO^-Z_3^+$, or $-PO_3H^-Z_3^+$, and wherein $Z_3^+$ is $H^+$, a metal cation, a quaternary ammonium cation, or mixtures thereof;

wherein $A_1$, $A_2$, and $A_3$ are each independently O, S, or NH;

wherein p is 1, 2, 3, or 4;

wherein q is 0, 1, 2, or 3;

wherein r, s, t, and o are independently 0, 1, 2, 3, 4, 5, or 6;

wherein n' is an integer from 0 to 5000;

wherein m' is an integer from 5 to 5000;

wherein a molar ratio of n'/m' is in a range of 0:1 to 20:1; and reacting phenolic hydroxyl functional groups (—OH) on $Ar_2''$ and amide functional groups (—CONH—) on $X_1''$ on the precursor polymer with an electrophile via a nucleophilic substitution reaction or a grafting reaction, and optionally acidifying the polymer in an acid solution to form a proton-conducting polymer comprising a plurality of repeating units of formula (I)

$$-(Ar_1-X_1)_{n}-(Ar_2-X_1)_{m}-; \quad (I)$$

wherein $Ar_1$ is selected from the group consisting of:

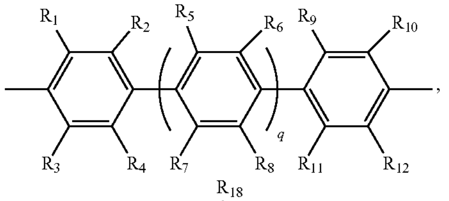
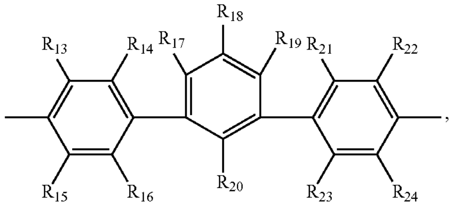
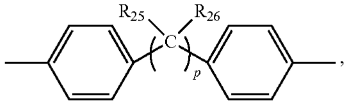
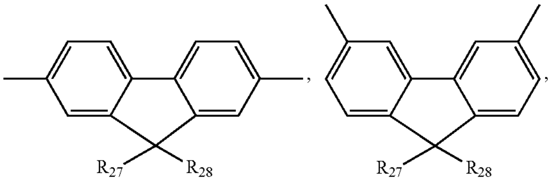
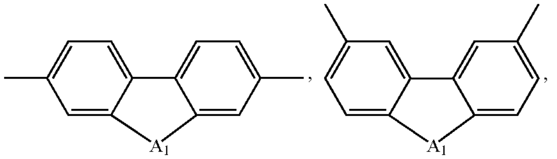
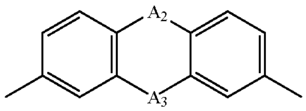

and mixtures thereof;

wherein $Ar_2$ is selected from the group consisting of:

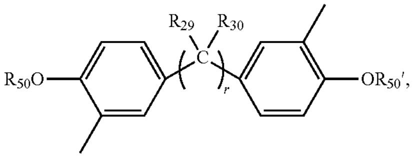
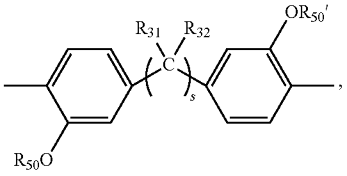
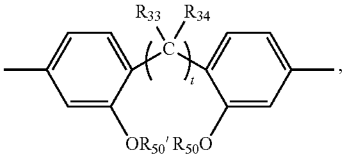
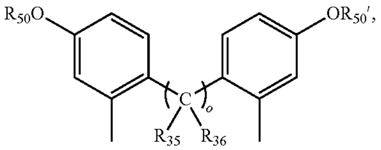
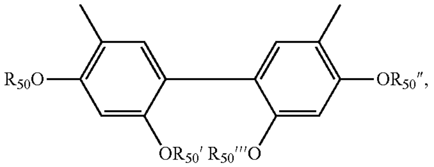
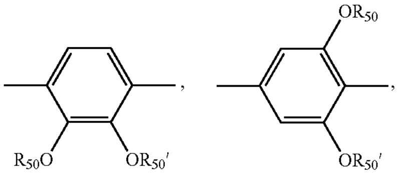
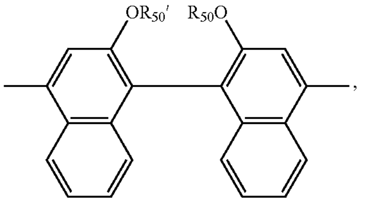
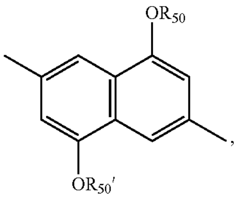
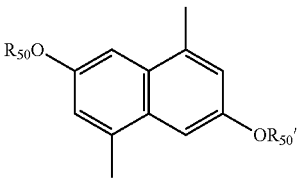

-continued

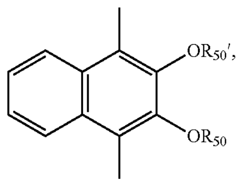

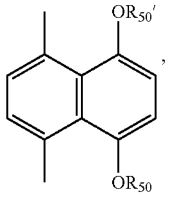

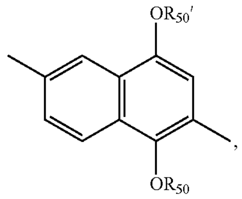

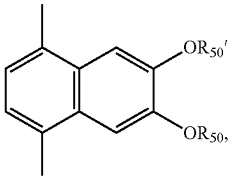

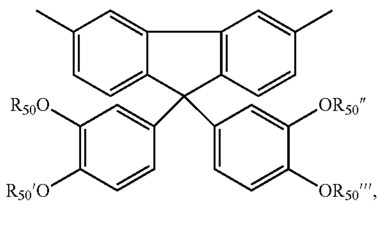

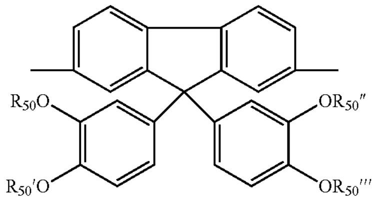

and mixtures thereof; and wherein $X_1$ is selected from the group consisting of:

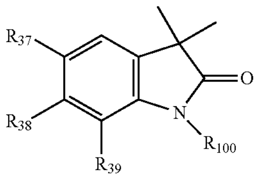

or a mixture of

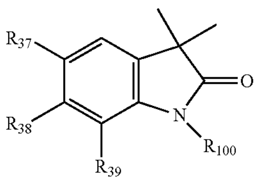

and one or more of:

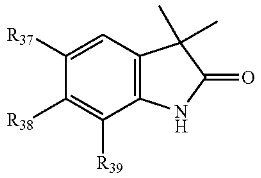

and

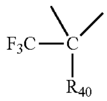

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_1^+$, —$COO^-Z_1^+$, or —$PO_3H^-Z_1^+$, and wherein $Z_1^+$ is $H^+$, a metal cation, a quaternary ammonium cation, or mixtures thereof;

wherein $R_{37}$-$R_{39}$ are each independently hydrogen, a halogen, a nitro group, an alkyl group, an alkenyl group, an alkynyl group, an aryl group, or an alkoxy group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_2^+$, —$COO^-Z_2^+$, or —$PO_3H^-Z_2^+$, and wherein $Z_2^+$ is $H^+$, a metal cation, a quaternary ammonium cation, or mixtures thereof;

wherein $R_{40}$ is an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_3^+$, —$COO^-Z_3^+$, or —$PO_3H^-Z_3^+$, and wherein $Z_3^+$ is $H^+$, a metal cation, a quaternary ammonium cation, or mixtures thereof;

wherein $R_{50}$, $R_{50}'$, $R_{50}''$, and $R_{50}'''$ are each independently hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group are substituted with an acid functional group or are substituted with a halogen and the acid functional group; wherein the acid functional group is —$SO_3^-Z_4^+$, —$COO^-Z_4^+$, or —$PO_3H^-Z_4^+$, and wherein $Z_4^+$ is $H^+$, a metal cation, a quaternary ammonium cation, or mixtures thereof; with the proviso that one or more of $R_{50}$ and $R_{50}'$ is not hydrogen, or one or more of $R_{50}$, $R_{50}'$, $R_{50}''$, and $R_{50}'''$ is not hydrogen;

wherein $R_{100}$ is independently a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group; wherein the acid functional group is —$SO_3^-Z_4^+$, —$COO^-Z_4^+$, or —$PO_3H^-Z_4^+$, and wherein $Z_4^+$ is $H^+$, a metal cation, a quaternary ammonium cation, or mixtures thereof;

wherein the halogen is F, Cl, Br, or I;

wherein $A_1$, $A_2$, and $A_3$ are each independently O, S, or N—$R_{200}$ and wherein $R_{200}$ is hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group; wherein the acid functional group is —$SO_3^-Z_4^+$, —$COO^-Z_4^+$, or —$PO_3H^-Z_4^+$, and wherein $Z_4^+$ is $H^+$, a metal cation, a quaternary ammonium cation, or mixtures thereof;

wherein p is 1, 2, 3, or 4;

wherein q is 0, 1, 2, or 3;

wherein r, s, t, and o are independently 0, 1, 2, 3, 4, 5, or 6;

wherein n is an integer from 0 to 5000;

wherein m is an integer from 5 to 5000; and wherein a molar ratio of n/m is in a range of 0:1 to 20:1.

In some embodiments, $Ar_1'$ is selected from the group consisting of:

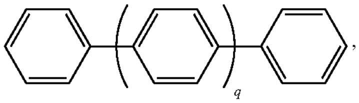,

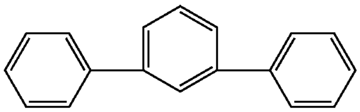,

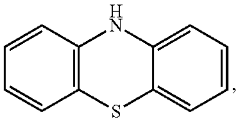, 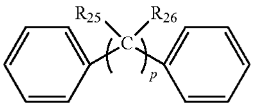,

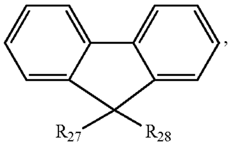, 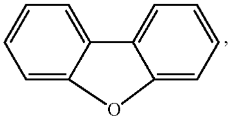,

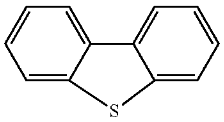

and mixtures thereof;

wherein $R_{25}$, $R_{26}$, $R_{27}$, and $R_{28}$ are each independently —H or —$CH_3$;

wherein p is 1 or 2; and wherein q is 0 or 1.

In some embodiments, $Ar_2'$ is selected from the group consisting of.

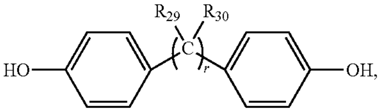

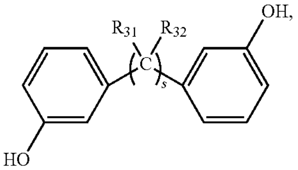

-continued

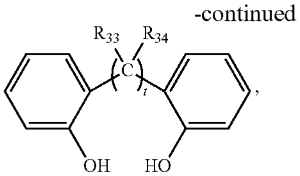,

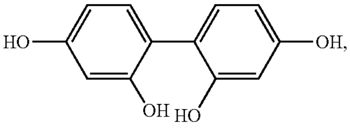 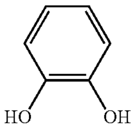,

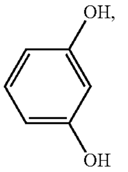 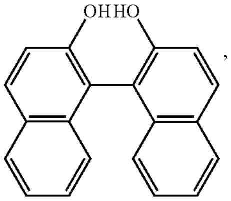,

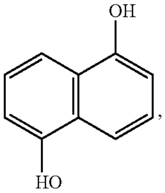, 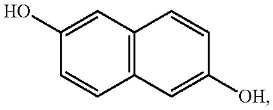

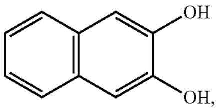 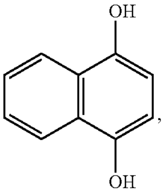,

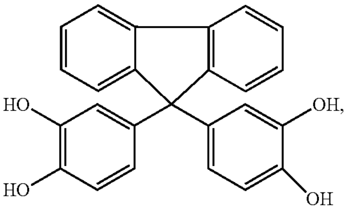

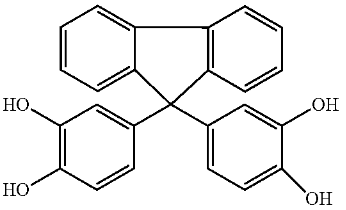

and mixtures thereof;

wherein $R_{29}$, $R_{30}$, $R_{31}$, $R_{32}$, $R_{33}$, and $R_{34}$ are each independently —$CH_3$ or —$CF_3$;

wherein r, s, and t are independent 0 or 1.

In some embodiments, $X_1'$ is

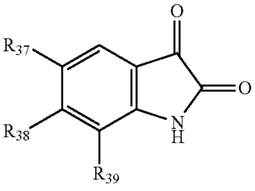

or a mixture of

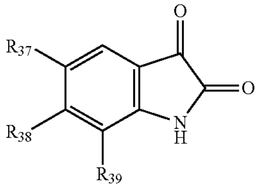

and

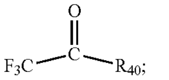

wherein $R_{37}$, $R_{38}$, and $R_{39}$ are each independently —H, $—CH_3$, $—CH_2CH_3$, $—CH(CH_3)_2$, $—C(CH_3)_3$, $—CH_2—C_6H_5$, or $—CH_2—CH(CH_3)_2$; and wherein $R_{40}$ is $—CH_3$, $—CH_2CH_3$, or $—C_6H_5$.

The proton-conducting polymer comprising a plurality of repeating units of formula (I) was synthesized from monomers $Ar_1'$, $Ar_2'$, and $X_1'$, such as p-terphenyl as $Ar_1'$ and 2,2'-dihydroxybiphenyl as $Ar_2'$ with isatin as $X_1'$, via a super acid catalyzed polyhydroxyalkylation reaction to form the precursor polymer comprising phenolic hydroxyl functional groups and isatin-based moieties, followed by a nucleophilic substitution reaction or a grafting reaction on the phenolic hydroxyl functional groups and the —NH groups on the isatin-based moieties, and then optionally an acidification reaction to incorporate hydrophilic proton-conducting acid functional groups to the polymer side chains. The proton-conducting polymer comprising a plurality of repeating units of formula (I) has a polymer backbone free of ether bonds, which results in high chemical stability of the polymer. The incorporation of electron-rich monomer $Ar_1'$ into the polymer provides a hydrophobic polymer backbone and the incorporation of monomers $Ar_2'$ with phenolic hydroxyl functional groups and $X_1'$ with isatin-based moieties not only increase the rigidity and free volume of the polymer, but also allows the introduction of hydrophilic proton-conducting acid functional groups to the polymer side chains via a nucleophilic substitution reaction or a grafting reaction. Therefore, the proton-exchange membranes prepared from this type of polymer have low cost, high chemical and thermal stability, high mechanical stability, lower membrane area specific resistance, significantly reduced gas or electrolyte crossover, and high proton ($H^+$) conductivity.

In some cases, the monomer $X_1'$ is a mixture of an isatin-based monomer and a non-isatin-based monomer to enable the formation of a high molecular weight polymer. The molar ratio of $Ar_1'$ monomer to $Ar_2'$ monomer for the synthesis of the polymer comprising a plurality of repeating units of formula (I) can be in a range of 0:1 to 20:1, or in a range of 10:1 to 1:10, or in a range of 5:1 to 1:5. The molar ratio of X1' monomer to $Ar_1'$ and $Ar_2'$ monomers for the synthesis of the polymer comprising a plurality of repeating units of formula (I) can be in a range of 1.2:1 to 1:1.2, or in a range of 1.1:1 to 1:1.1, or in a range of 1.05:1 to 1:1.05.

The superacid catalyzed polyhydroxyalkylation reaction can be carried out at 0° C. to 50° C., or at 10° C. to 30° C., or at 20° C. to 30° C. for 2 h to 72 h, or 10 h to 48 h, or 12 to 24 h. Suitable superacid catalysts include, but are not limited to, trifluoromethanesulfonic acid ($CF_3SO_3H$ (TFSA)), methanesulfonic acid (MSA), fluorosulfuric acid ($FSO_3H$), or mixtures thereof. Solvents for the polyhydroxyalkylation reaction are those that can dissolve one or more of the monomers. Suitable solvents include, but are not limited to, methylene chloride, chloroform, trifluoroacetic acid (TFA), or mixtures thereof.

The nucleophilic substitution reaction or grafting reaction can be carried out at about 20° C. to about 150° C., or at about 30° C. to about 130° C., or at about 50° C. to about 100° C. for 2 h to 72 h, or 5 h to 48 h, or 5 to 24 h. Solvents for the nucleophilic substitution reaction or grafting reaction are those that can dissolve the precursor polymer comprising phenolic hydroxyl functional groups and isatin-based moieties. Suitable solvents include, but are not limited to, N-methyl-2-pyrrolidone (NMP), dimethylacetamide (DMAc), dimethylformamide (DMF), dimethyl sulfoxide (DMSO), dioxanes, 1,3-dioxolane, and mixtures thereof. In some embodiments, anhydrous $K_2CO_3$ was used for the nucleophilic substitution reaction or grafting reaction to catalyze the reaction. Suitable electrophiles for the nucleophilic substitution reaction or the grafting reaction include, but are not limited to, sodium bromopropanesulfate and 1,3-propanesultone.

The acids suitable for the final optional acidification reaction include, but are not limited to, hydrochloric acid, sulfuric acid, or phosphoric acid.

The proton-conducting polymer comprising a plurality of repeating units of formula (I) has a weight average molecular weight in a range of 10,000 to 1,000,000 Daltons, or in a range of 50,000 to 500,000 Daltons.

Another aspect of the invention is a proton-exchange membrane comprising a proton-conducting polymer comprising a plurality of repeating units of formula (I). The proton-exchange membrane may be used in a wide variety of applications including, but not limited to, fuel cells, electrolyzers, flow batteries, electrodialyzers, waste metal recovery systems, electrocatalytic hydrogen production systems, desalinators, water purifiers, waste water treatment systems, ion exchangers, or $CO_2$ separators.

Figure 2:
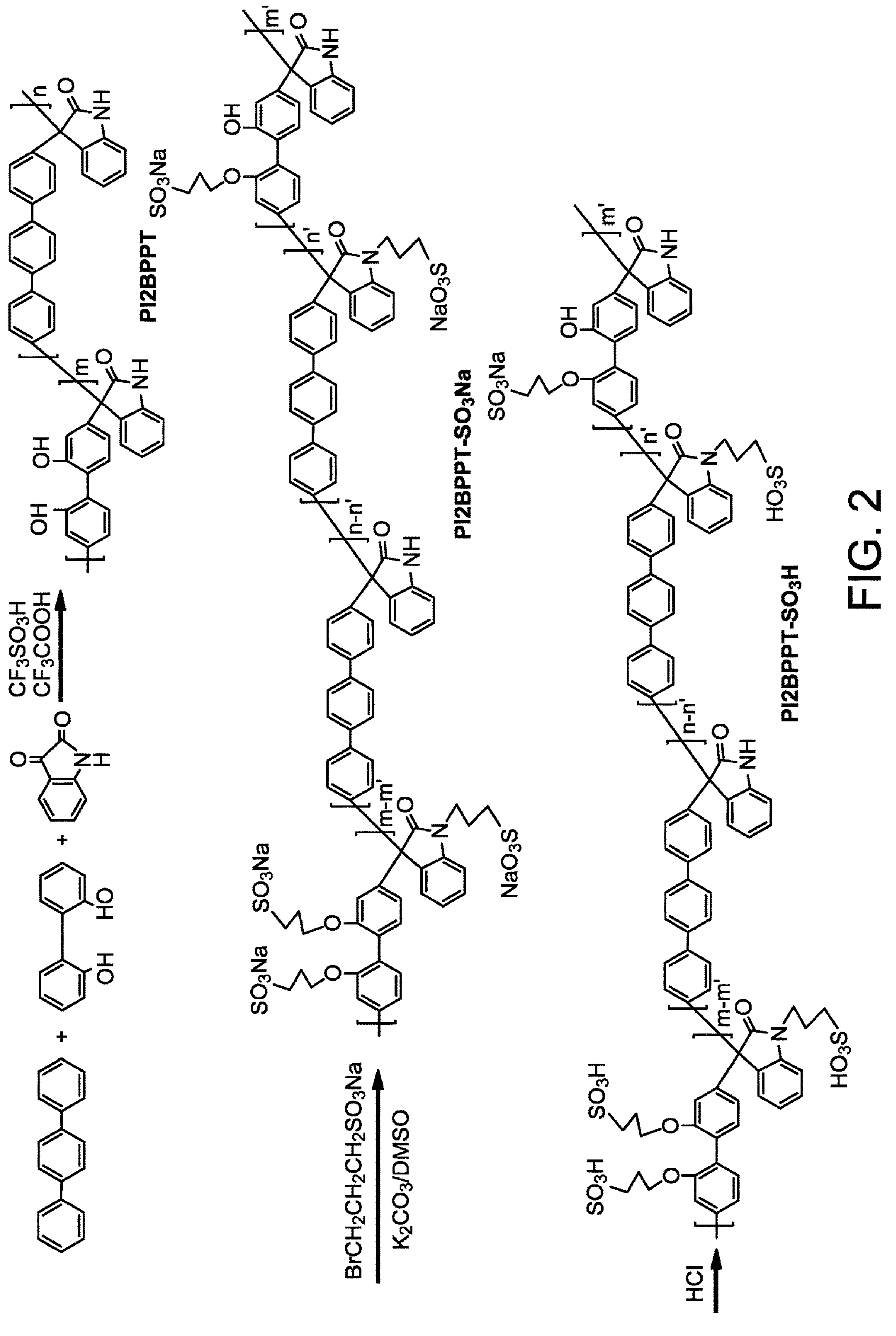
FIG. 2 is an illustration of one embodiment of the synthesis of PI2BPPT-$SO_3H$ proton-conducting polymer.

In one embodiment, a proton-conducting polymer, sulfonated poly(isatin-2, 2'-biphenol-p-terphenyl) (abbreviated as PI2BPPT-$SO_3H$), was synthesized according to FIG. 2 from isatin, 2,2'-biphenol, and p-terphenyl monomers via a super acid catalyzed polyhydroxyalkylation reaction followed by a nucleophilic substitution reaction to graft sodium propanesulfate functional groups on the 2, 2'-biphenol unit and the isatin unit of the polymer, and finally an acidification reaction to convert sodium propanesulfate functional groups on the polymer to propanesulfonic acid functional groups to form the sulfonated non-fluorinated ether-free aromatic proton-conducting polymer PI2BPPT-$SO_3H$. The degree of sulfonation was controlled by the amount of sodium bromopropanesulfate and the reaction conditions. The sodium propanesulfate functional groups were selectively grafted on —OH of the 2, 2'-biphenol unit and —NH of the isatin unit. The chemical structure of PI2BPPT-$SO_3H$ polymer was identified by $^1H$ NMR. A PI2BPPT-$SO_3H$ proton-exchange membrane was prepared from the PI2BPPT-$SO_3H$ polymer. The PI2BPPT-$SO_3H$ proton-exchange membrane showed high $H^+$ conductivity of 146 mS/cm due to grafting of sulfonic acid functional groups on both —OH of the 2, 2'-biphenol unit and —NH of the isatin unit. Therefore, the introduction of both 2, 2'-biphenol and isatin units to PI2BPPT-$SO_3H$ polymer helps to achieve high $H^+$ conductivity.

In some embodiments, the proton-exchange membrane comprising a proton-conducting polymer comprising a plurality of repeating units of formula (I) comprises a nonporous symmetric dense film membrane, an integrally-skinned asymmetric membrane, a reinforced composite membrane, or a thin film composite membrane. By "dense" we mean that the membrane does not have pores larger than 1 nm.

In some embodiments, the reinforced composite membrane or the thin film composite membrane comprises a porous substrate membrane impregnated or coated with the proton-conducting polymer. The porous substrate membrane is prepared from a polymer different from the proton-conducting polymer.

In some embodiments, the nonporous symmetric dense film membrane, the integrally-skinned asymmetric membrane, the reinforced composite membrane, or the thin film composite membrane may be a flat sheet membrane.

In some embodiments, the nonporous symmetric dense film proton-exchange membrane comprising a proton-conducting polymer comprising a plurality of repeating units of formula (I) is prepared using a method comprising: 1) dissolving the proton-conducting polymer comprising a plurality of repeating units of formula (I) in a solvent to form a polymer casting solution; 2) casting the polymer casting solution on a nonporous substrate to form a uniform layer of the polymer casting solution; 3) drying the polymer casting solution layer to form a dried membrane on the nonporous substrate at 50° C. to 180° C., or at 50° C. to 120° C., or at 80° C. to 120° C. to form the nonporous symmetric dense film proton-exchange membrane. The nonporous substrate is removed from the membrane when the membrane is used in a desired application. The solvent used to dissolve the proton-conducting polymer can be selected from, but is not limited to, NMP, DMAc, DMF, DMSO, 1,3-dioxolane, or mixtures thereof. The nonporous substrate used for the fabrication of the nonporous symmetric dense film membrane can be selected from, but is not limited to, glass plate, polyolefin film, polyester film, or fluorocarbon-based polymer film such as poly(tetrafluoroethylene) (PTFE) and poly (vinylidene fluoride) (PVDF) film.

In some embodiments, the integrally-skinned asymmetric proton-exchange membrane is prepared using a method comprising: 1) making a proton-exchange membrane casting solution comprising the proton-conducting polymer with formula (I), solvents which are miscible with water and can dissolve the proton-conducting polymer, and non-solvents which cannot dissolve the proton-conducting polymer; 2) casting a layer of the proton-exchange membrane casting solution onto a supporting substrate; 3) evaporating the solvent and non-solvent from the surface of the coated layer and then coagulating the coated polymer layer in a coagulating bath to form the integrally-skinned asymmetric membrane structure; 5) drying the membrane at 50° C. to 150° C., or at 50° C. to 120° C., or at 80° C. to 120° C. to form the integrally-skinned asymmetric proton-exchange membrane. In some embodiments, the supporting substrate is removed from the membrane when the membrane is used in a desired application. In some embodiments, the supporting substrate is part of the final integrally-skinned asymmetric proton-exchange. The supporting substrate may comprise polyolefin such as polypropylene and polyethylene, polyester, polyamide such as Nylon 6 and Nylon 6,6, cellulose, or fluorocarbon-based polymer such as PTFE and PVDF. The solvents for the preparation of the integrally-skinned asymmetric membrane include, but are not limited to, NMP, DMAc, DMF, DMSO, dioxanes, 1,3-dioxolane, and mixtures thereof. The non-solvents for the preparation of the integrally-skinned asymmetric membrane include, but are not limited to, acetone, methanol, ethanol, tetrahydrofuran (THF), toluene, n-octane, n-decane, lactic acid, citric acid, isopropanol, and mixtures thereof. The integrally-skinned asymmetric membrane may have a thin nonporous dense layer less than 500 nm on a microporous support layer.

In some embodiments, the reinforced composite proton-exchange membrane is prepared using a method comprising: 1) dissolving the proton-conducting polymer in a solvent to form a polymer solution; 2) impregnating a porous matrix support membrane with the proton-conducting polymer solution to fill the pores with the proton-conducting polymer via dip-coating, soaking, spraying, painting, or other known conventional solution impregnating method; 3) drying the impregnated membrane at 50° C. to 150° C., or at 50° C. to 120° C., or at 80° C. to 120° C. to form the reinforced composite proton-exchange membrane with interconnected proton-conducting polymer domains in a porous matrix. The solvents for the preparation of the thin film composite proton-exchange membrane include, but are not limited to, NMP, DMAc, DMF, DMSO, dioxanes, 1,3-dioxolane, and mixtures thereof. The porous matrix should have good thermal stability (stable up to at least 120° C.), high stability under high pH condition (e.g., pH greater than 8), high resistance to oxidizing and reducing conditions (insoluble and no performance drop under oxidizing and reducing conditions), high mechanical strength (no dimensional change under the system operation conditions), as well as other factors dictated by the operating conditions for electrochemical reactions. The porous matrix must be compatible with the electrochemical cell chemistry and meet the mechanical demands of cell stacking or winding assembly operations.

The polymers suitable for the preparation of the porous matrix can be selected from, but not limited to, polyolefins such as polyethylene and polypropylene, polyamide such as Nylon 6 and Nylon 6,6, polyester, cellulose acetate, polybenzimidazole, fluorocarbon-based polymers such as PTFE and PVDF, polycarbonate, cellulose, or combinations thereof. These polymers provide a range of properties such as low cost, high stability in alkaline water, good mechanical stability, and ease of processability for porous matrix fabrication.

The porous matrix can be either a non-woven matrix or a woven matrix and has either a symmetric porous structure or an asymmetric porous structure. The porous matrix can be formed by an electrospinning process, a phase inversion membrane fabrication approach followed by direct air drying, or by phase inversion followed by solvent exchange methods. The porous matrix also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the pores. The wet processing of polyolefin porous matrix is done with the aid of a hydrocarbon liquid or low molecular weight oil mixed with the polymer resin or a mixture of the polymer resin and inorganic nanoparticles in the melt phase. The melt mixture is extruded through a die similar to the dry processed separators. The thickness of the porous matrix can be in a range of 10-400 micrometers, or a range of 10-200 micrometers, or a range of 10-100 micrometers, or a range of 20-100 micrometers. The pore size of the porous matrix can be in a range of 1 micrometer to 500 micrometers, or a range of 10 micrometer to 200 micrometers, or a range of 50 micrometers to 100 micrometer.

In some embodiments, the thin film composite proton-exchange membrane is prepared using a method comprising: 1) dissolving the proton-conducting polymer in a solvent to form a polymer coating solution; 2) coating a layer of the proton-conducting polymer coating solution on one surface of a microporous support membrane via dip-coating, meniscus coating, spin coating, casting, soaking, spraying, painting, or other known conventional solution coating technologies; 3) drying the coated membrane at 50° C. to 150° C., or at 50° C. to 120° C., or at 80° C. to 120° C. to form the thin film composite proton-exchange membrane. The solvents for the preparation of the thin film composite proton-exchange membrane include, but are not limited to, NMP, DMAc, DMF, DMSO, dioxanes, 1,3-dioxolane, and mixtures thereof. The microporous support membrane should have good thermal stability (stable up to at least 120° C.), high stability under high pH condition (e.g., pH greater than 8), high resistance to oxidizing and reducing conditions (insoluble and no performance drop under oxidizing and reducing conditions), high mechanical strength (no dimensional change under the system operation conditions), as well as other factors dictated by the operating conditions for electrochemical reactions. The microporous support membrane must be compatible with the electrochemical cell chemistry and meet the mechanical demands of cell stacking or winding assembly operations.

The polymers suitable for the preparation of the microporous support membrane can be selected from, but not limited to, polyolefins such as polyethylene and polypropylene, polyamide such as Nylon 6 and Nylon 6,6, polyester, cellulose acetate, polybenzimidazole, fluorocarbon-based polymer such as PTFE and PVDF, polycarbonate, cellulose, or combinations thereof. These polymers provide a range of properties such as low cost, high stability in alkaline water or acidic water, good mechanical stability, and ease of processability for membrane fabrication.

The microporous support membrane can have either a symmetric porous structure or an asymmetric porous structure. The asymmetric microporous support membrane can be formed by a phase inversion membrane fabrication approach followed by direct air drying, or by phase inversion followed by solvent exchange methods. The microporous support membrane also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the micropores. The wet processing of polyolefin separators is done with the aid of a hydrocarbon liquid or low molecular weight oil mixed with the polymer resin or a mixture of the polymer resin and inorganic nanoparticles in the melt phase. The melt mixture is extruded through a die similar to the dry processed separators. The thickness of the microporous support membrane can be in a range of 10-400 micrometers, or a range of 10-200 micrometers, or a range of 10-100 micrometers, or a range of 20-100 micrometers. The pore size of the microporous membrane can be in a range of 10 nanometers to 50 micrometers, or a range of 50 nanometers to 10 micrometers, or a range of 0.2 micrometers to 1 micrometer.

Another aspect of the invention is a membrane electrode assembly. In one embodiment, the membrane electrode assembly comprises: a proton-exchange membrane comprising a proton-conducting polymer comprising a plurality of repeating units of formula (I); an anode comprising an anode catalyst on a first surface of the proton-exchange membrane; and a cathode comprising a cathode catalyst on a second surface of the proton-exchange membrane.

In some embodiments, the membrane electrode assembly further comprises: an anode gas diffusion layer adjacent to the anode; and a cathode gas diffusion layer adjacent to the cathode. In some embodiments, the anode and the cathode catalysts are platinum group metal (PGM) electrocatalysts or PGM-free electrocatalysts. The anode and the cathode catalysts are for oxygen evolution reaction and hydrogen evolution reaction, respectively. The anode and the cathode catalysts should have good electrical conductivity, and good electrocatalytic activity and stability. Suitable cathode catalysts can be selected from, but are not limited to, carbon supported platinum (Pt/C), non-platinum group metal incorporated Pt-based catalysts, and mixtures thereof. Suitable anode catalysts can be selected from, but are not limited to, iridium (Ir)-based catalysts, Ir-ruthenium (Ru)-based catalysts, nickel (Ni), iron (Fe), tungsten (W) or cobalt (Co) incorporated Ir-based catalysts or Ir—Ru-based catalysts. Ni—Fe alloy, Ni—Mo alloy, spinel $Cu_xCo_{3x}O_3$, Ni—Fe layered double hydroxide nanoplates on carbon nanotubes, and mixtures thereof. The anode catalysts can be unsupported or immobilized on conductive supports.

In some embodiments, the anode comprising an anode catalyst on a first surface of the proton-exchange membrane is formed by coating an anode catalyst ink on the first surface of the proton-exchange membrane via meniscus coating, knife coating, Mayer rod coating, spray coating, painting, or other known conventional ink coating technologies, followed by drying the coated proton-exchange membrane.

In some embodiments, the cathode comprising a cathode catalyst on a second surface of the proton-exchange membrane is formed by coating a cathode catalyst ink on the second surface of the proton-exchange membrane via meniscus coating, knife coating, Mayer rod coating, spray coating, painting, or other known conventional ink coating technologies, followed by drying the coated proton-exchange membrane.

In some embodiments, the anode comprising an anode catalyst on a first surface of the proton-exchange membrane and the cathode comprising a cathode catalyst on a second surface of the proton-exchange membrane are formed simultaneously by coating an anode catalyst ink on the first surface of the proton-exchange membrane and a cathode catalyst ink on the second surface of the proton-exchange membrane via meniscus coating, knife coating, Mayer rod coating, spray coating, painting, or other known conventional ink coating technologies, followed by drying the coated proton-exchange membrane.

In some embodiments, the anode catalyst ink comprises the anode catalyst, a proton exchange ionomer as a binder, and a solvent. In some embodiments, the cathode catalyst ink comprises the cathode catalyst, a proton exchange ionomer as a binder, and a solvent. The proton exchange ionomer binder creates $H^+$ transport pathways between the membrane and the reaction sites within the electrodes and thus drastically improves the utilization of the electrocatalyst particles while reducing the internal resistance. The proton exchange ionomer binder can be the proton-conducting polymer comprising a plurality of repeating units of formula (I), or a proton exchange ionomer having a chemical structure similar to the proton-conducting polymer described above, so that the binder will allow low interfacial resistance and similar expansion in contact with water to avoid catalyst delamination, but high $H^+$ conductivity and high oxygen and hydrogen permeance. The solvent can be selected from, but is not limited to, water, alcohol, or a mixture thereof.

The anode gas diffusion layer and the cathode gas diffusion layer simultaneously transport electrons, heat, and products with minimum voltage, current, thermal, interfacial, and fluidic losses. The cathode and anode gas diffusion layers can be made from, but are not limited to, gold (Au)- or platinum (Pt)-coated stainless steel, titanium meshes, titanium felts, or titanium foams.

EXAMPLES

The following examples are provided to illustrate one or more preferred embodiments of the invention but are not limited embodiments thereof. Numerous variations can be made to the following examples that lie within the scope of the invention.

Example 1: Preparation of Sulfonated Poly(Isatin-4, 4'-Biphenol-p-Terphenyl) Proton-Exchange Membrane (Abbreviated as PI4BPPT-$SO_3H$ Membrane)

A sulfonated poly(isatin-4, 4'-biphenol-p-terphenyl) proton-conducting polymer (abbreviated as PI4BPPT-$SO_3H$) was synthesized by two steps. In the first step, three monomers, p-terphenyl (9.79 g, 42.5 mmol), 4, 4'-biphenol (1.40 g, 7.5 mmol), and isatin (7.36 g, 50 mmol) were charged to a 500 mL three necked flask equipped with an overhead mechanical stirrer. Anhydrous methylene chloride (50 ml) was added to the flash and stirred for 5 min to form a suspension. The flask was then immersed in an ice bath to keep the reaction at low temperature. A mixture of trifluoromethanesulfonic acid (50 mL) and trifluoroacetic acid (25 mL) was added to the flask dropwise. Thereafter, the reaction continued for 24 h. The resulting viscous, dark blue solution was poured slowly into water under stirring. The solid was shredded into powders by a blender, filtered, washed with water, and immersed in 0.5 M $K_2CO_3$ overnight to remove the acids completely. The polymer was filtered and washed thoroughly by water followed by drying at 60° C. under vacuum. The yield of the precursor polymer poly(isatin-4, 4'-biphenol-p-terphenyl) was 97%.

In the second step, to a 400 ml glass bottle, poly(isatin-4, 4'-biphenol-p-terphenyl) (10 g) was dissolved in DMAc (60 g). 1,3-propanesultone (5 g) was added quickly. The solution was stirred for 3 days at room temperature. Then the temperature was increased to 60° C. The reaction was continued for another 6 h. The resultant viscous, yellow solution was used directly to cast a membrane on a glass plate with the knife gap of 20 mil. After drying at 60° C. overnight, the membrane was detached and further dried in a vacuum oven at 130° C. for 24 h. The membrane was soaked in 1M HCl at 80° C. for 24 h to form sulfonated poly(isatin-4, 4'-biphenol-p-terphenyl) proton exchange polymer membrane (abbreviated as PI4BPPT-$SO_3H$ membrane). The in-plane proton conductivity of the PI4BPPT-$SO_3H$ membrane was 92 mS/cm at room temperature.

Example 2: Preparation of Sulfonated Poly(Isatin-2, 2'-Biphenol-p-Terphenyl) Proton-Exchange Membranes (Abbreviated as PI2BPPT-$SO_3H$ Membranes)

As shown in FIG. 2, sulfonated poly(isatin-2, 2'-biphenol-p-terphenyl) proton-conducting polymers comprising different 2'-biphenol/p-terphenyl molar ratios were synthesized via a super acid catalyzed polyhydroxyalkylation reaction of three monomers, p-terphenyl, isatin, and 2,2'-biphenol, followed by a nucleophilic substitution reaction to graft sodium propanesulfate functional groups on the 2, 2'-biphenol unit and the isatin unit of the polymer, and finally an acidification reaction to convert sodium propanesulfate functional groups on the polymer to propanesulfonic acid functional groups to form the sulfonated non-fluorinated ether-free proton-conducting polymer PI2BPPT-$SO_3H$. Several PI2BPPT-$SO_3H$ polymers were synthesized by varying the molar ratios of 2,2'-biphenol to p-terphenyl, such as 15:85 (abbreviated as PI2BPPT-$SO_3H$-15), 50:50 (abbreviated as PI2BPPT-$SO_3H$-50), 75:25 (abbreviated as PI2BPPT-$SO_3H$-75), and 100:0 (abbreviated as PI2BPPT-$SO_3H$-100).

As an example, PI2BPPT-$SO_3H$-50 was synthesized by two steps. In the first step, two monomers, p-terphenyl (11.5 g, 50 mmol) and 2, 2'-biphenol (9.3 g, 50 mmol) were charged to a 500 mL three necked flask equipped with an overhead mechanical stirrer. Trifluoromethanesulfonic acid (60 ml) was added to the flask and stirred for 5 min to form a suspension. The flask was then immersed in an ice bath to keep the reaction at low temperature. In a separate bottle, isatin (15.0 g, 102 mmol) was dissolved in trifluoroacetic acid (60 mL) and carefully transferred to a dripping funnel. Anhydrous methylene chloride (30 ml) was used to wash the bottle and transfer all the isatin solution to the dripping funnel. The isatin solution was added dropwise to the flask containing p-terphenyl and 2, 2'-biphenol within 2 h. Thereafter, the reaction was continued for additional 4-5 h. The resulting viscous, bluish solution was poured slowly into water under stirring. The light-yellow solid was shredded into powders in a blender, filtered, washed with water, and stirred in ethanol overnight. The polymer was filtered and washed thoroughly by ethanol followed by drying at 100° C. under vacuum. The yield of the white precursor polymer PI2BPPT-50 was 95%.

In the second step, to a 400 ml glass bottle, PI2BPPT-50 (10 g) was dissolved in DMSO (160 ml). Potassium carbonate (10 g) and sodium bromopropanesulfate (15 g) were added to the solution. The solution was stirred for 24 h at 70° C. The resultant viscous solution was cooled down and poured into acetone slowly. The resulting polymer PI2BPPT-$SO_3Na$-50 was filtered and soaked in 1M HCl at 80° C. for 24 to convert PI2BPPT-$SO_3Na$-50 to the sulfonated PI2BPPT-$SO_3H$-50 proton-conducting polymer. The PI2BPPT-$SO_3H$-50 proton-conducting polymer was filtered and washed by water followed by drying at 100° C. under vacuum.

A PI2BPPT-$SO_3H$-50 proton-exchange membrane was prepared from PI2BPPT-$SO_3H$-50 proton-conducting polymer by casting a 15 wt % PI2BPPT-$SO_3H$-50 solution in DMSO on a glass plate with a knife gap of 22 mil. After drying at 60° C. overnight, the membrane was detached and further dried in vacuum oven at 150° C. for 2 days to form sulfonated poly(isatin-2, 2'-biphenol-p-terphenyl) proton exchange polymer membrane (abbreviated as PI2BPPT-$SO_3H$-50 membrane). The in-plane proton conductivity of the PI2BPPT-$SO_3H$-50 membrane was 123 mS/cm at room temperature.

Similarly, PI2BPPT-$SO_3H$-75 membrane is prepared from sulfonated PI2BPPT-$SO_3H$-75 proton-conducting polymer and the in-plane proton conductivity of the PI2BPPT-$SO_3H$-75 membrane was 146 mS/cm at room temperature.

Example 3: Preparation of Sulfonated Poly(Isatin-1, 1'-Bi-2-Naphthol-p-Terphenyl) Proton-Exchange Membrane (Abbreviated as PI1NPT-$SO_3H$ Membrane)

A sulfonated poly(isatin-1,1'-bi-2-naphthol-p-terphenyl) proton-exchange membrane (abbreviated as PI1NPT-$SO_3H$ membrane) was synthesized by two steps. In the first step, PI1NPT polymer was synthesized via a super acid catalyzed polyhydroxyalkylation reaction of three monomers, p-terphenyl, isatin, and 1,1'-bi-2-naphthol. The three monomers, p-terphenyl (9.79 g, 42.5 mmol), 1, 1'-bi-2-naphthol (2.15 g, 7.5 mmol) and isatin (7.36 g, 50 mmol) were charged to a 500 mL three necked flask equipped with an overhead mechanical stirrer. Anhydrous methylene chloride (50 ml) was added to the flash and stirred for 5 min to form a suspension. The flask was then immersed in an ice bath to keep the reaction at low temperature. A mixture of trifluoromethanesulfonic acid (50 mL) and trifluoroacetic acid (25 mL) was added dropwise to the flask. Thereafter, the reaction continued for 4 h. The resulting viscous, dark blue solution was poured slowly into water. The solid was shredded into powders by a blender, filtered, washed with water, and immersed in water overnight. The polymer was filtered and washed thoroughly by water followed by drying at 60° C. under vacuum. The yield of the precursor PI1NPT polymer was 99%.

In the second step of a nucleophilic substitution reaction, to a 400 ml glass bottle, PI1NPT polymer (10 g) was dissolved in DMAc (56.7 g) to form a 15 wt % solution. 1,3-propanesultone (5 g) was added quickly to the solution. The solution was stirred for 16 h at 60° C. The resultant solution was used directly to cast a membrane on a glass plate with the knife gap of 22 mil. After drying at 60° C. overnight, the membrane was detached and further dried in vacuum oven at 120° C. for 24 h. The membrane was soaked in 1M HCl at 80° C. for 12 h to form sulfonated poly(isatin-1,1'-bi-2-naphthol-p-terphenyl) proton-exchange membrane (abbreviated as PI1NPT-$SO_3H$ membrane).

Example 4: Preparation of sulfonated poly(p-terphenyl-2,2'-biphenol-1-3-isatin-2,2,2-trifluoroacetophenone-4-1) proton-exchange membrane (abbreviated as PTBIT-$SO_3H$ membrane)

Sulfonated poly(p-terphenyl-2,2'-biphenol-1-3-isatin-2,2,2-trifluoroacetophenone-4-1) proton-conducting polymer (abbreviated as PTBIT-$SO_3H$) was synthesized via a super acid catalyzed polyhydroxyalkylation reaction of four monomers, p-terphenyl, 2,2'-biphenol, isatin, and 2,2,2-trifluoroacetophenone, followed by a nucleophilic substitution reaction to graft sodium propanesulfate functional groups on the 2, 2'-biphenol unit and the isatin unit of the polymer, and finally an acidification reaction to convert sodium propanesulfate functional groups on the polymer to propanesulfonic acid functional groups to form the sulfonated ether-free proton-conducting polymer PTBIT-$SO_3H$. The molar ratio of 2,2-dihydroxybiphenyl:p-terphenyl:isatin:2,2,2-trifluoroacetophenone is 0.75:0.25:0.8:0.2.

In the first step, p-terphenyl (2.88 g, 12.5 mmol) and 2, 2'-biphenol (7.01 g, 37.5 mmol) were charged to a 500 mL three necked flask equipped with an overhead mechanical stirrer. Anhydrous methylene chloride (50 ml) was added to the flash and stirred for 5 min to form a suspension. The flask was then immersed in an ice bath to keep the suspension at low temperature. A mixture of trifluoromethanesulfonic acid (50 mL), trifluoroacetic acid (25 mL), isatin (5.89 g, 40 mmol), and 2,2,2-trifluoroacetophenone (1.74 g, 10 mmol) was added to the flask dropwise. Thereafter, the reaction was continued for 14 h. The resulting viscous solution was poured slowly into a mixture of water and methanol under stirring. The solid was shredded into powders by a blender, filtered, washed with water, and immersed in 0.5 M $K_2CO_3$ overnight to remove the acids completely. The polymer was filtered and washed thoroughly with methanol followed by drying at 80° C. under vacuum. The yield of the poly(p-terphenyl-2,2'-biphenol-1-3-isatin-2,2,2-trifluoroacetophenone-4-1) (abbreviated as PTBIT) precursor polymer was 96%.

In the second step, to a 400 ml glass bottle, PTBIT precursor polymer (10 g) was dissolved in DMSO (160 ml). Potassium carbonate and sodium bromopropanesulfate were added to the solution. The solution was stirred for 24 h at 70° C. The resultant viscous solution was cooled down and poured into acetone slowly. The resulting polymer PTBIT-$SO_3Na$ was filtered and soaked in 1M HCl at 80° C. for 24 to convert PTBIT-$SO_3Na$ to the sulfonated PTBIT-$SO_3H$ proton-conducting polymer. The PTBIT-$SO_3H$ proton-conducting polymer was filtered and washed by water followed by drying at 100° C. under vacuum.

A PTBIT-$SO_3H$ proton-exchange membrane was prepared from PTBIT-$SO_3H$ proton-conducting polymer by casting a 20 wt % PTBIT-$SO_3H$ solution in NMP on a glass plate with a knife gap of 20 mil. After drying at 60° C. overnight, the membrane was detached and further dried in vacuum oven at 120° C. for 2 days to form sulfonated PTBIT-$SO_3H$ proton-exchange polymer membrane.

Example 5: Evaluation of $H_2$ Fluxes of PI2BPPT-$SO_3H$-75 Membrane and Nafion® 212 Membrane The $H_2$ flux of PI2BPPT-$SO_3H$-75 membrane (36 μm) and Nafion®212 membrane (51 μm) were measured by a gas permeation unit. The membrane was loaded into a stainless-steel circular permeation cell inside a temperature-controlled oven. The effective area of the testing cell was 19.61 $cm^2$. Pure $H_2$ feed gas was fully saturated with water vapor by bubbling through stainless-steel humidifiers inside the temperature-controlled oven. The oven temperature was controlled at 50° C. The flow rate of the permeate $H_2$ gas was measured using an ADM flowmeter (Agilent Technologies). The PI2BPPT-$SO_3H$-75 membrane showed a lower $H_2$ flux of 0.36 mmol/$cm^2$/sec than Nafion® 212 with a $H_2$ flux of 0.58 mmol/$cm^2$/sec under 200 psig $H_2$ feed pressure even though PI2BPPT-$SO_3H$-75 membrane is thinner than Nafion® 212 membrane. These results indicate that the PI2BPPT-$SO_3H$-75 membrane will have lower $H_2$ and $O_2$ crossover for electrolysis and fuel cell applications than Nafion® 212 membrane.

Example 6. Preparation of a Membrane Electrode Assembly (MEA) Comprising PI2BPPT-$SO_3H$-75 Membrane for Water Electrolysis A MEA comprising PI2BPPT-$SO_3H$-75 membrane was prepared by a catalyst coated on membrane (CCM) method using IrO2 as an oxygen evolution reaction (OER) catalyst for the anode and Pt/C as a hydrogen evolution reaction (HER) catalyst for the cathode. Catalyst inks for spray coating were prepared by mixing the catalysts and PI2BPPT-$SO_3H$-75 proton-conducting polymer in DI water and isopropanol. The mixture was finely dispersed using an ultrasonication bath. PI2BPPT-$SO_3H$-75 proton-conducting polymer contents in the anode and the cathode were controlled to about 10 wt % in the total content of the catalyst and PI2BPPT-$SO_3H$-75 proton-conducting polymer. The Pt/C ink was spray coated onto one side of the membrane. The Pt loading was about 0.3 mg/$cm^2$. IrO2 ink was spray coated onto the other side of the membrane. IrO2 loading was about 2.0 mg/$cm^2$.

SPECIFIC EMBODIMENTS

While the following is described in conjunction with specific embodiments, it will be understood that this description is intended to illustrate and not limit the scope of the preceding description and the appended claims.

A first embodiment of the invention is a composition comprising a plurality of repeating units of formula (I)

$$-(Ar_1-X_1)_n-(Ar_2-X_1)_m-$$

wherein one or more of $Ar_1$, $Ar_2$, and $X_1$ comprises an acid functional group, wherein the acid functional group comprises $-SO_3^-Z^+$, $-COO^-Z^+$, or $-PO_3H^-Z^+$, and wherein $Z^+$ is $H^+$, a metal cation, a quaternary ammonium cation, or mixtures thereof, wherein $Ar_1$ is selected from the group consisting of

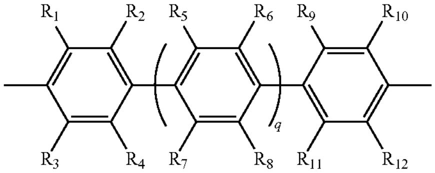
,
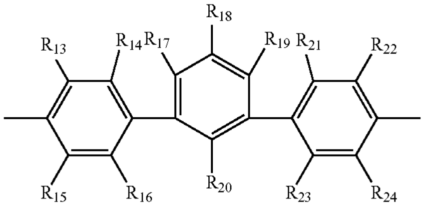
,
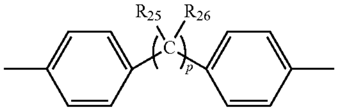
,
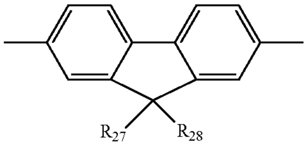
,
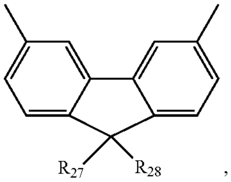
,
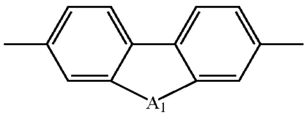
,
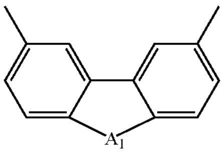
,
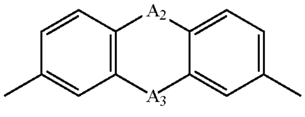

and mixtures thereof; wherein $Ar_2$ is selected from the group consisting of

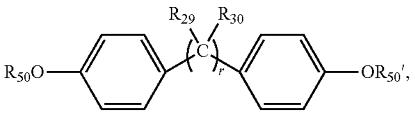
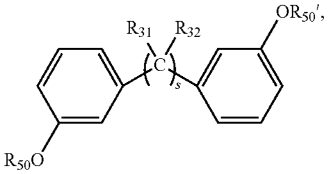
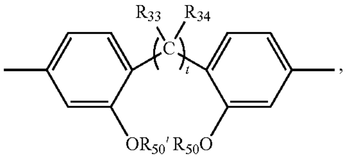
,
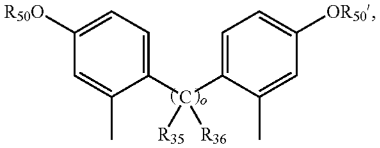
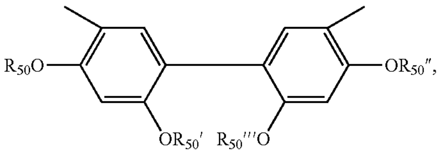
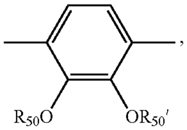
,
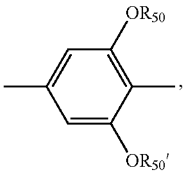
,
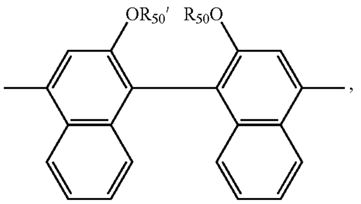
,
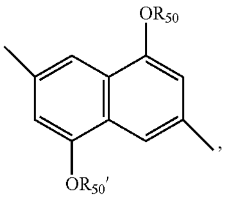
,
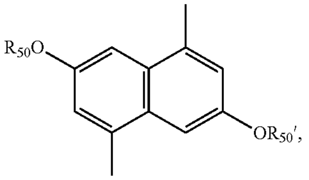
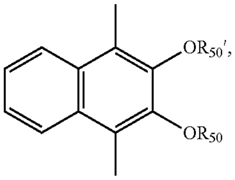
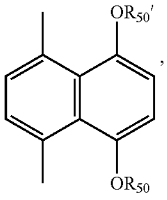
, -continued

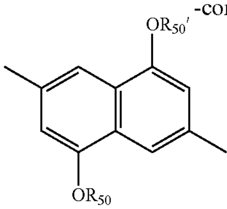
,
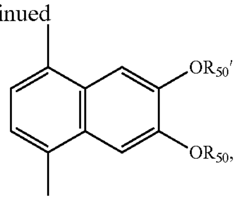

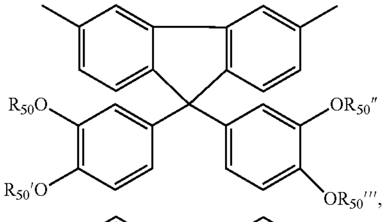

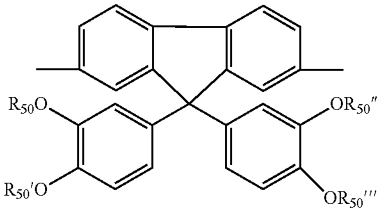

and mixtures thereof, and wherein $X_1$ is selected from the group consisting of

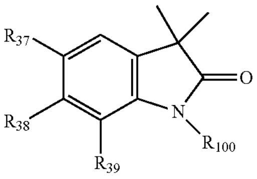

or a mixture of

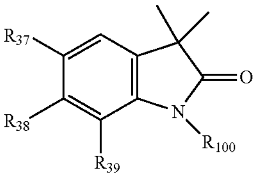

and one or more of

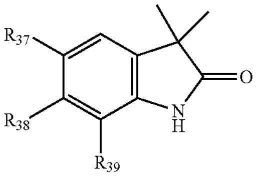
and
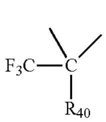

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_1^+$, —$COO^-Z_1^+$, or —$PO_3H^-Z_1^+$, and wherein $Z_1^+$ is $H^+$, a metal cation, a quaternary ammonium cation, or mixtures thereof, wherein $R_{37}$-$R_{39}$ are each independently hydrogen, a halogen, a nitro group, an alkyl group, an alkenyl group, an alkynyl group, an aryl group, or an alkoxy group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_2^+$, —$COO^-Z_2^+$, or —$PO_3H^-Z_2^+$, and wherein $Z_2^+$ is $H^+$, a metal cation, a quaternary ammonium cation, or mixtures thereof; wherein $R_{40}$ is an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_3^+$, —$COO^-Z_3^+$, or —$PO_3H^-Z_3^+$, and wherein $Z_3^+$ is $H^+$, a metal cation, a quaternary ammonium cation, or mixtures thereof; wherein $R_{50}$, $R_{50}'$, $R_{50}''$, and $R_{50}'''$ are each independently hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group are substituted with an acid functional group or are substituted with a halogen and the acid functional group; wherein the acid functional group is —$SO_3^-Z_4^+$, —$COO^-Z_4^+$, or —$PO_3H^-Z_4^+$, and wherein $Z_4^+$ is $H^+$, a metal cation, a quaternary ammonium cation, or mixtures thereof; with the proviso that one or more of $R_{50}$ and $R_{50}'$ is not hydrogen, or one or more of $R_{50}$, $R_{50}'$, $R_{50}''$, and $R_{50}'''$ is not hydrogen; wherein $R_{100}$ is independently a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group; wherein the acid functional group is —$SO_3^-Z_4$, —$COO^-Z_4^+$, or —$PO_3H^-Z_4^+$, and wherein $Z_4^+$ is $H^+$, a metal cation, a quaternary ammonium cation, or mixtures thereof; wherein the halogen is F, Cl, Br, or I; wherein $A_1$, $A_2$, and $A_3$ are each independently O, S, or N—$R_{200}$ and wherein $R_{200}$ is hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group; wherein the acid functional group is —$SO_3^-Z_4$, —$COO^-Z_4^+$, or —$PO_3H^-Z_4^+$, and wherein $Z_4^+$ is $H^+$, a metal cation, a quaternary ammonium cation, or mixtures thereof; wherein p is 1, 2, 3, or 4; wherein q is 0, 1, 2, or 3; wherein r, s, t, and o are independently 0, 1, 2, 3, 4, 5, or 6; and wherein n is an integer from 0 to 5000; wherein m is an integer from 5 to 5000; and wherein a molar ratio of n/m is in a range of 0:1 to 20:1. An embodiment of the invention is one, any or all of prior embodiments in this paragraph up through the first embodiment in this paragraph wherein $Ar_1$ is selected from the group consisting of

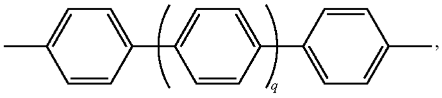
,

-continued
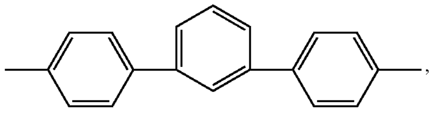
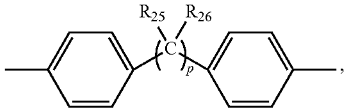
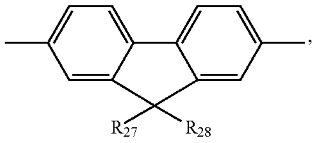
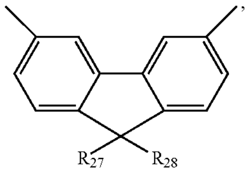
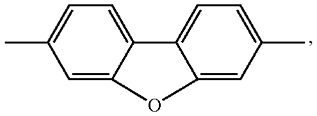
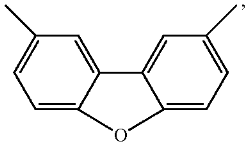
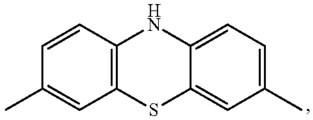
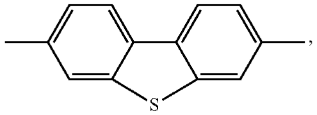
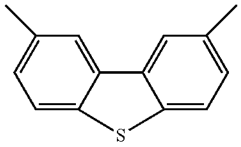
and mixtures thereof, wherein $R_{25}$, $R_{26}$, $R_{27}$, and $R_{28}$ are each independently —H or —$CH_3$; wherein p is 1 or 2; and wherein q is 0 or 1. An embodiment of the invention is one, any or all of prior embodiments in this paragraph up through the first embodiment in this paragraph wherein $Ar_2$ is selected from the group consisting of
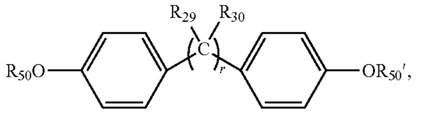
-continued
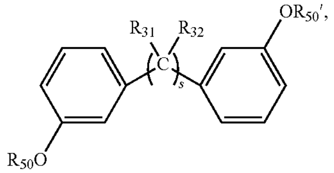
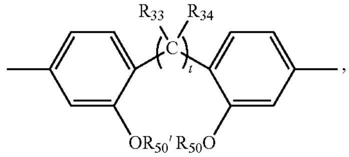
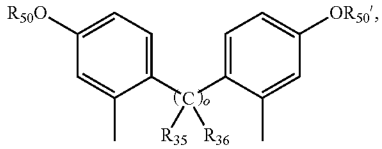
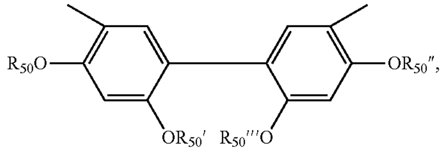
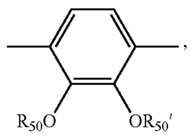
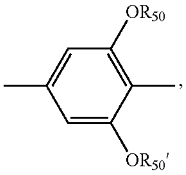
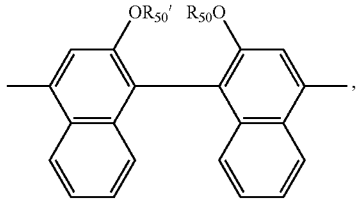
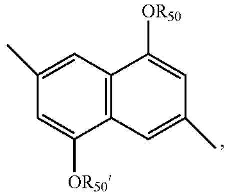
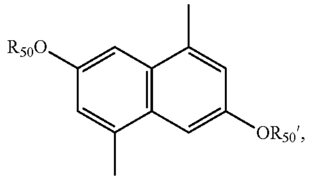
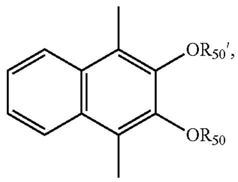
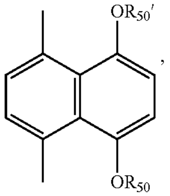

-continued

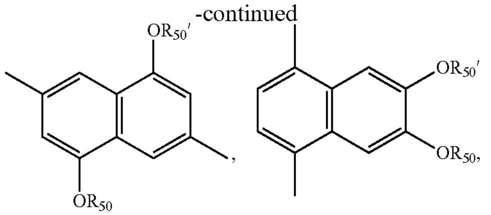

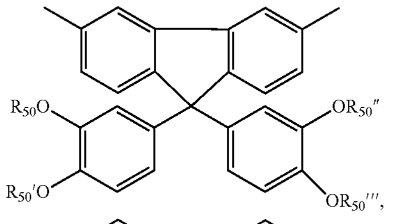

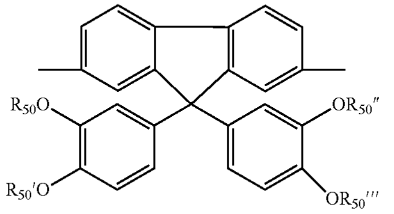

and mixtures thereof; wherein $R_{29}$-$R_{36}$ are each independently —$CH_3$ or —$CF_3$; wherein $R_{50}$, $R_{50}'$, $R_{50}''$, and $R_{50}'''$ are each independently hydrogen or r —$(CH_2)_3SO_3^-Z_4^+$ and wherein $Z_4$+ is $H^+$, a metal cation, a quaternary ammonium cation, or mixtures thereof, with the proviso that one or more of $R_{50}$ and $R_{50}'$ is not hydrogen, or one or more of $R_{50}$, $R_{50}'$, $R_{50}''$, and $R_{50}'''$ is not hydrogen; and wherein r, s, t, and o are each independently 0 or 1. An embodiment of the invention is one, any or all of prior embodiments in this paragraph up through the first embodiment in this paragraph wherein $X_1$ is

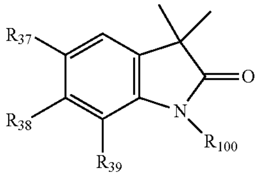

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{100}$ is —$(CH_2)_3SO_3^-Z_4^+$ and wherein $Z_4^+$ is $H^+$, a metal cation, a quaternary ammonium cation, or mixtures thereof. An embodiment of the invention is one, any or all of prior embodiments in this paragraph up through the first embodiment in this paragraph wherein $X_1$ is a mixture of

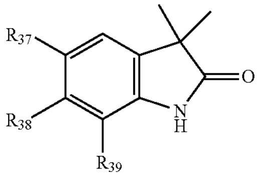

and

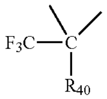

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; wherein $R_{40}$ is —$CH_3$, —$CH_2CH_3$, or —$C_6H_5$; and wherein $R_{100}$ is —$(CH_2)_3SO_3^-Z_4^+$ and wherein $Z_4^+$ is $H^+$, a metal cation, a quaternary ammonium cation, or mixtures thereof. An embodiment of the invention is one, any or all of prior embodiments in this paragraph up through the first embodiment in this paragraph wherein $X_1$ is a mixture of

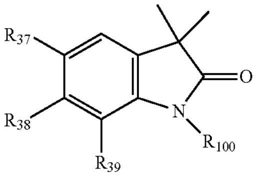

and

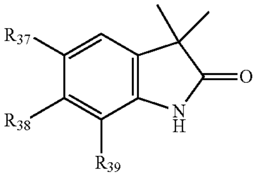

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{100}$ is —$(CH_2)_3SO_3^-Z_4^+$ and wherein $Z_4^+$ is $H^+$, a metal cation, a quaternary ammonium cation, or mixtures thereof. An embodiment of the invention is one, any or all of prior embodiments in this paragraph up through the first embodiment in this paragraph wherein $X_1$ is a mixture of

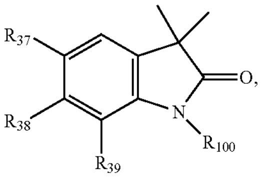

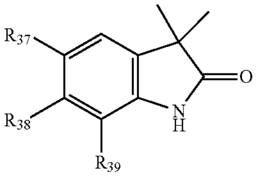

and

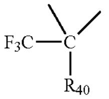

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; wherein $R_{40}$ is —$CH_3$, —$CH_2CH_3$, or —$C_6H_5$; and wherein $R_{100}$ is —$(CH_2)_3SO_3^-Z_4^+$ and wherein $Z_4^+$ is $H^+$, a metal cation, a quaternary ammonium cation, or mixtures thereof. An embodiment of the invention is one, any or all of prior embodiments in this paragraph up through the first embodiment in this paragraph wherein $Ar_1$ is selected from the group consisting of

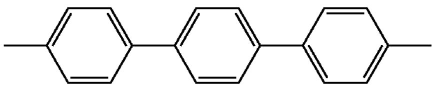

,

-continued

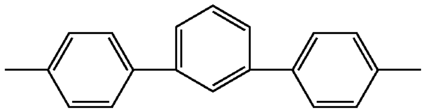
,
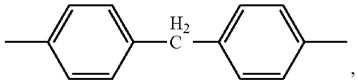
,
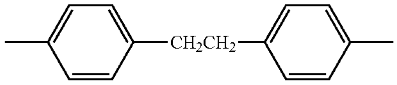

and mixtures thereof. An embodiment of the invention is one, any or all of prior embodiments in this paragraph up through the first embodiment in this paragraph wherein $Ar_2$ is selected from the group consisting of

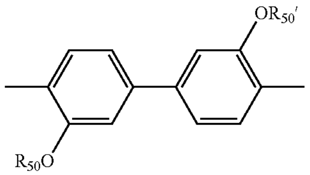
,
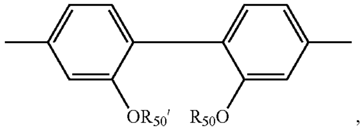
,
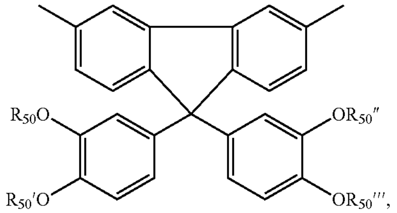
,
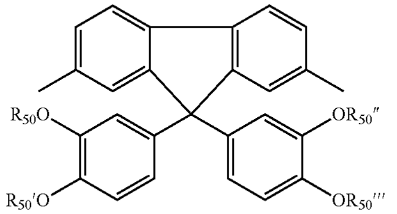

and mixtures thereof; wherein $R_{50}$, $R_{50}'$, $R_{50}''$, and $R_{50}'''$ are each independently hydrogen or $—(CH_2)_3SO_3^-Z_4^+$ and wherein $Z_4^+$ is $H^+$, $Na^+$, $K^+$, $NH_4^+$, or mixtures thereof, with the proviso that one or more of $R_{50}$ and $R_{50}$ is not hydrogen, or one or more of $R_{50}$, $R_{50}'$, $R_{50}''$, and $R_{50}'''$ is not hydrogen. An embodiment of the invention is one, any or all of prior embodiments in this paragraph up through the first embodiment in this paragraph wherein X1 is

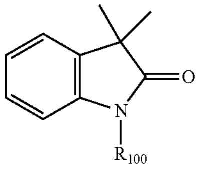

or a mixture of

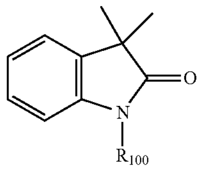

and one or more of

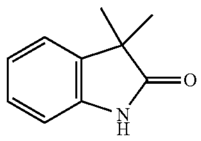

and

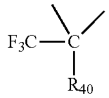

wherein $R_{100}$ is $—(CH_2)_3SO_3^-Z_4^+$ and wherein $Z_4^+$ is $H^+$, $Na^+$, $K^+$, $NH_4^+$, or mixtures thereof; wherein $R_{40}$ is $—CH_3$, $—CH_2CH_3$, or $—C_6H_5$. An embodiment of the invention is one, any or all of prior embodiments in this paragraph up through the first embodiment in this paragraph wherein the polymer comprises the reaction product of reacting monomers $Ar_1'$, $Ar_2'$, and $X_1'$ via a polyhydroxyalkylation reaction in the presence of a super acid catalyst to synthesize a precursor polymer comprising a plurality of repeating units of formula (II) having phenolic hydroxyl functional groups $$-\left(Ar_1-X_1''\right)_{n'}\left(Ar_2''-X_1''\right)_{m'}- ; \quad \text{(II)}$$

wherein $Ar_1'$ is selected from the group consisting of

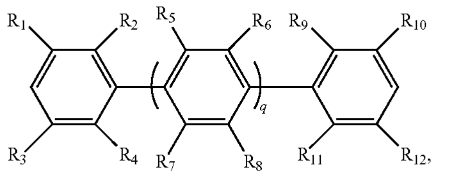
,
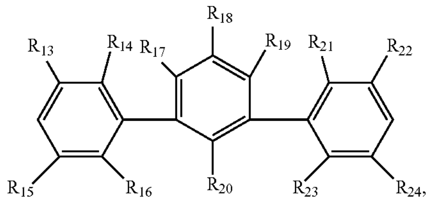
,
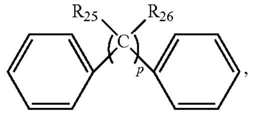
,
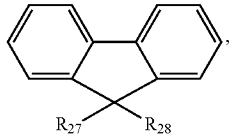
,
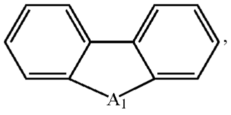
,

-continued
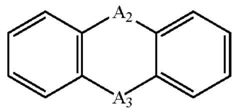
and mixtures thereof, wherein $Ar_2'$ is selected from the group consisting of
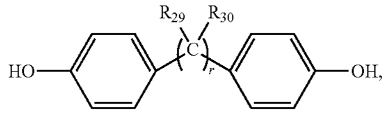
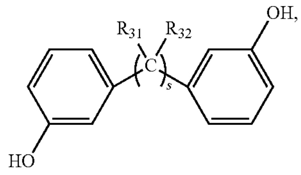
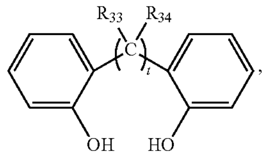
,
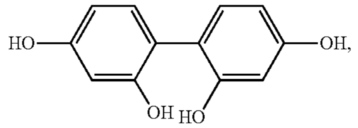
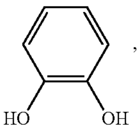
,
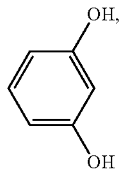
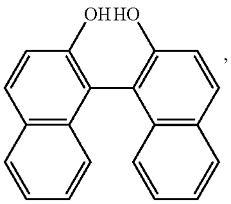
,
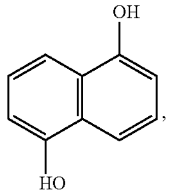
,
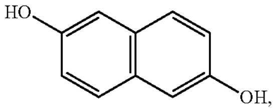
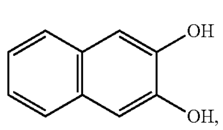
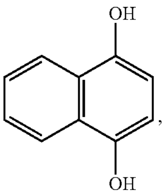
,
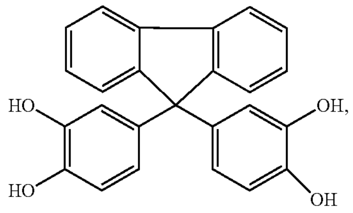
-continued
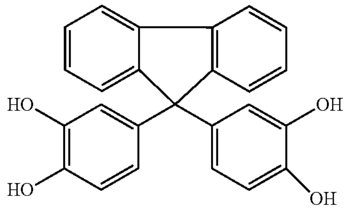
and mixtures thereof, wherein $X_1'$ is
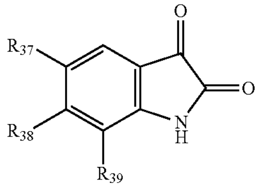
or a mixture of
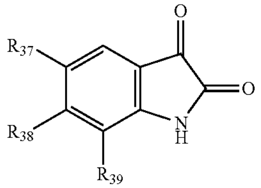
and
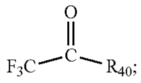
wherein $Ar_1$ is selected from the group consisting of
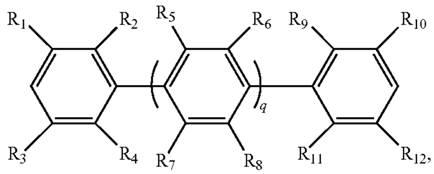
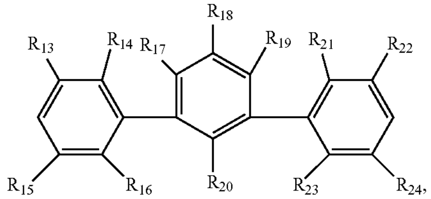
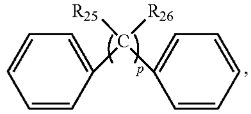
,
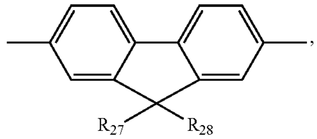
, -continued
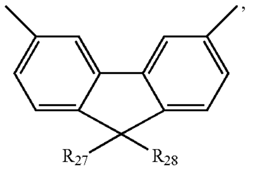
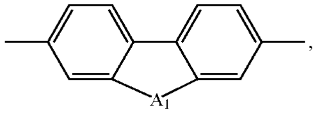
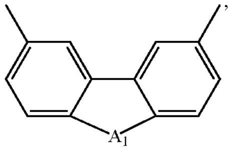
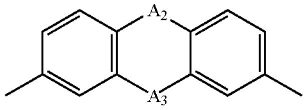
and mixtures thereof; wherein $Ar_2$" is selected from the group consisting of
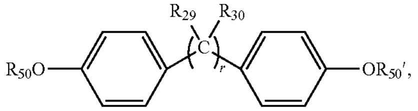
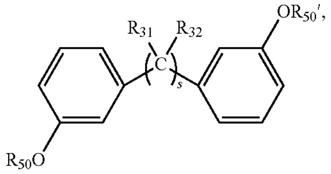
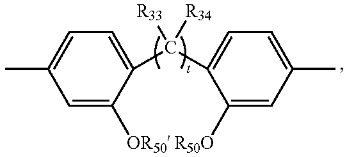
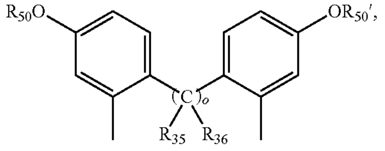
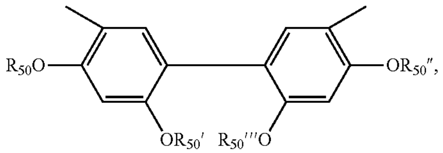
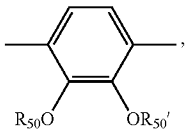
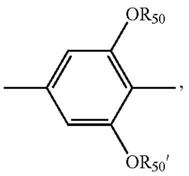
-continued
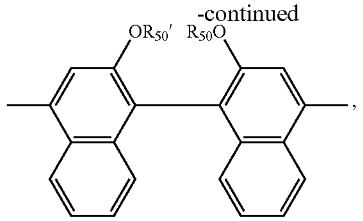
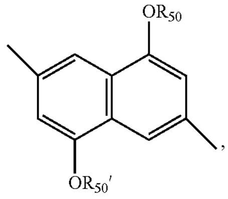
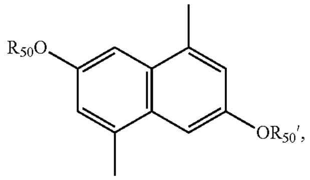
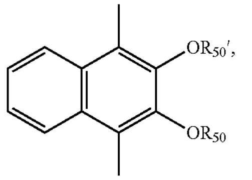
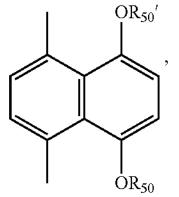
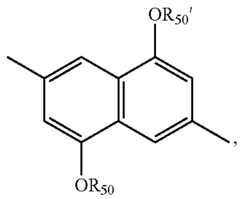
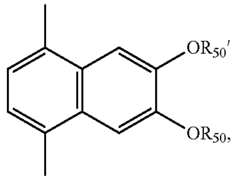
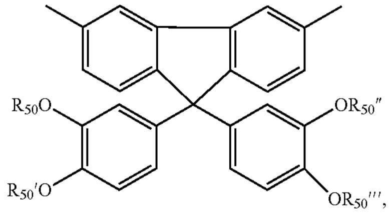
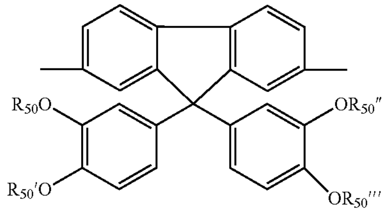
and mixtures thereof; wherein $X_1$" is selected from the group consisting of
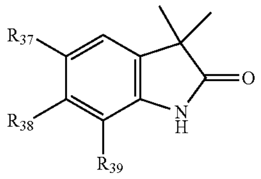

or a mixture of

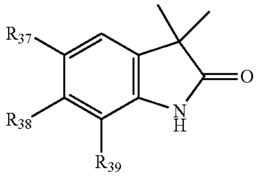

and

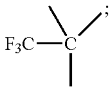

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen, an acid functional group, or both the halogen and the acid functional group, and wherein the acid functional group is $-SO_3^-Z_1^+$, $-COO^-Z_1^+$, or $-PO_3H^-Z_1^+$, and wherein $Z_1^+$ is $H^+$, a metal cation, a quaternary ammonium cation, or mixtures thereof; wherein $R_{37}$-$R_{39}$ are each independently hydrogen, a halogen, a nitro group, an alkyl group, an alkenyl group, an alkynyl group, an aryl group, or an alkoxy group, and wherein the alkyl group, the alkenyl group, the alkynyl group, or the aryl group is optionally substituted with a halogen, an acid functional group, or both the halogen and the acid functional group, and wherein the acid functional group is $-SO_3^-Z_2^+$, $-COO^-Z_2^+$, or $-PO_3H^-Z_2^+$, and wherein $Z_2^+$ is $H^+$, a metal cation, a quaternary ammonium cation, or mixtures thereof; wherein $R_{40}$ is an alkyl group, an alkenyl group, an alkynyl group, or an aryl group, and wherein the alkyl group, the alkenyl group, the alkynyl group, or the aryl group is optionally substituted with a halogen, an acid functional group, or both the halogen and the acid functional group, and wherein the acid functional group is $-SO_3^-Z_3^+$, $-COO^-Z_3^+$, or $-PO_3H^-Z_3^+$, and wherein $Z_3^+$ is $H^+$, a metal cation, a quaternary ammonium cation, or mixtures thereof, wherein $A_1$, $A_2$, and $A_3$ are each independently O, S, or NH; wherein p is 1, 2, 3, or 4; wherein q is 0, 1, 2, or 3; wherein r, s, t, and o are independently 0, 1, 2, 3, 4, 5, or 6; and wherein n' is an integer from 0 to 5000; wherein m' is an integer from 5 to 5000; wherein a molar ratio of n'/m' is in a range of 0:1 to 20:1; and reacting phenolic hydroxyl functional groups (—OH) on $Ar_2$" and amide functional groups (—CONH—) on $X_1$" on the precursor polymer with an electrophile via a nucleophilic substitution reaction or a grafting reaction, and optionally acidifying the polymer in an acid solution to form a proton-conducting polymer comprising a plurality of repeating units of formula (I)

$$\left(Ar_1-X_1\right)_n\left(Ar_2-X_1\right)_m;\qquad (I)$$

wherein $Ar_1$ is selected from the group consisting of

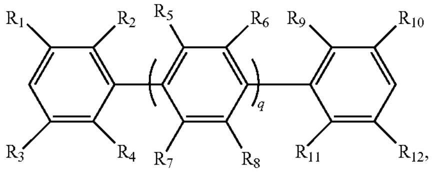

-continued

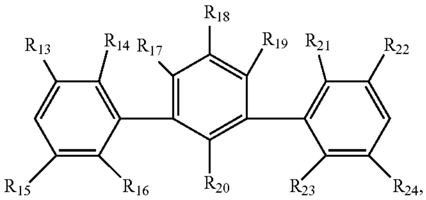

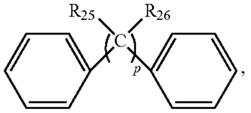

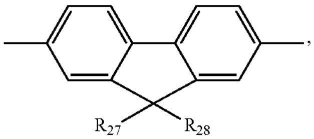

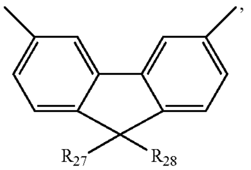

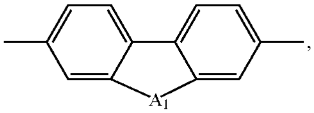

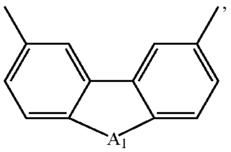

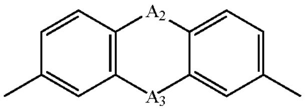

and mixtures thereof, wherein $Ar_2$ is selected from the group consisting of

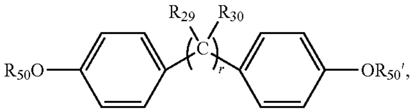

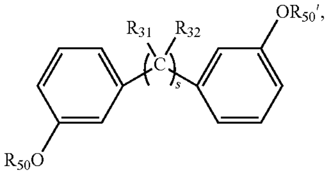

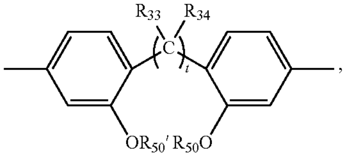

-continued

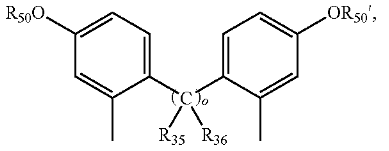

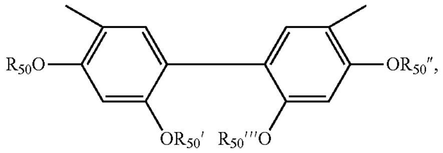

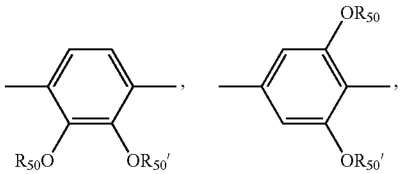

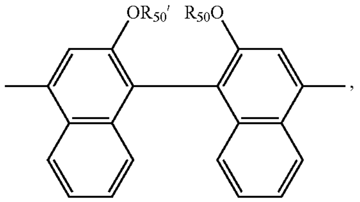

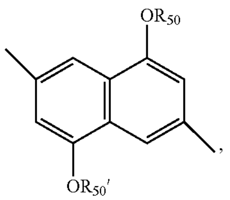

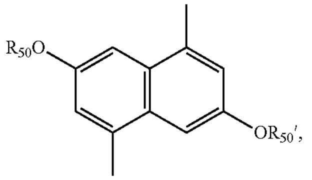

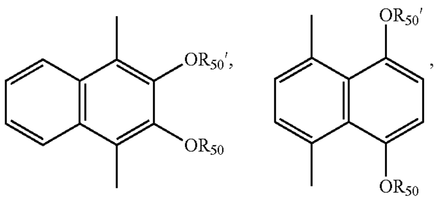

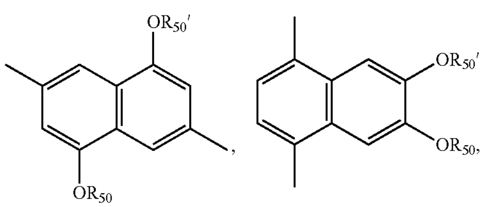

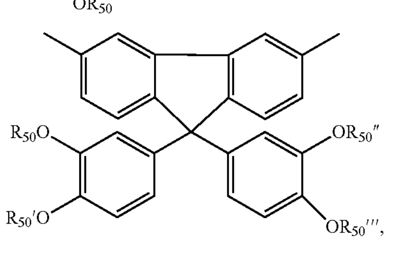

-continued

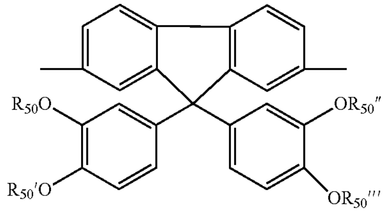

and mixtures thereof, and wherein $X_1$ is selected from the group consisting of

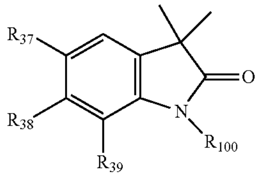

or a mixture of

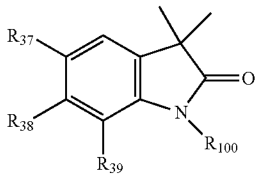

and one or more of

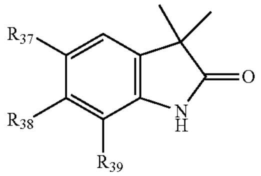

and

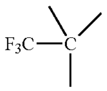

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is $SO_3^-Z_1^+$, —$COO^-Z_1^+$, or —$PO_3H^-Z_1^+$, and wherein $Z_1^+$ is $H^+$, a metal cation, a quaternary ammonium cation, or mixtures thereof, wherein $R_{37}$-$R_{39}$ are each independently hydrogen, a halogen, a nitro group, an alkyl group, an alkenyl group, an alkynyl group, an aryl group, or an alkoxy group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_2^+$, —$COO^-Z_2^+$, or —$PO_3H^-Z_2^+$, and wherein $Z_2^+$ is $H^+$, a metal cation, a quaternary ammonium cation, or mixtures thereof; wherein $R_{40}$ is an alkyl group, an alkenyl group, an alkynyl group, or an aryl group, and wherein the alkyl group, the alkenyl group, the alkynyl group group, or the aryl group is optionally substituted with a halogen, an acid functional group, or the halogen and the acid functional group, and wherein the acid functional group is $—SO_3^-Z_3^+$, $—COO^-Z_3^+$, or $—PO_3H^-Z_3^+$, and wherein $Z_3^+$ is $H^+$, a metal cation, a quaternary ammonium cation, or mixtures thereof; wherein $R_{50}$, $R_{50}'$, $R_{50}''$, and $R_{50}'''$ are each independently hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group are substituted with an acid functional group or are substituted with a halogen and the acid functional group; wherein the acid functional group is $—SO_3^-Z_4^+$, $—COO^-Z_4^+$, or $—PO_3H^-Z_4^+$, and wherein $Z_4^+$ is $H^+$, a metal cation, a quaternary ammonium cation, or mixtures thereof; with the proviso that one or more of $R_{50}$ and $R_{50}'$ is not hydrogen, or one or more of $R_{50}$, $R_{50}'$, $R_{50}''$, and $R_{50}'''$ is not hydrogen; wherein $R_{100}$ is independently a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group; wherein the acid functional group is $—SO_3^-Z_4^+$, $—COO^-Z_4^+$, or $—PO_3H^-Z_4^+$, and wherein $Z_4^+$ is $H^+$, a metal cation, a quaternary ammonium cation, or mixtures thereof; wherein the halogen is F, Cl, Br, or I; wherein $A_1$, $A_2$, and $A_3$ are each independently O, S, or $N—R_{200}$ and wherein $R_{200}$ is hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group; wherein the acid functional group is $—SO_3^-Z_4^+$, $—COO^-Z_4^+$, or $—PO_3H^-Z_4^+$, and wherein $Z_4^+$ is $H^+$, a metal cation, a quaternary ammonium cation, or mixtures thereof; wherein p is 1, 2, 3, or 4; wherein q is 0, 1, 2, or 3; wherein r, s, t, and o are independently 0, 1, 2, 3, 4, 5, or 6; and wherein n is an integer from 0 to 5000; wherein m is an integer from 5 to 5000; and wherein a molar ratio of n/m is in a range of 0:1 to 20:1. An embodiment of the invention is one, any or all of prior embodiments in this paragraph up through the first embodiment in this paragraph wherein $Ar_1'$ is selected from the group consisting of

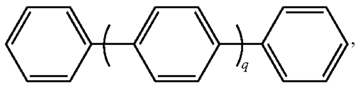

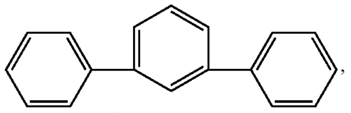

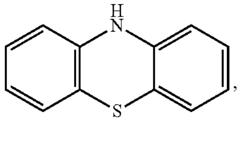

-continued

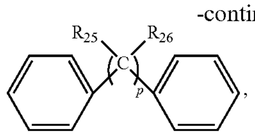

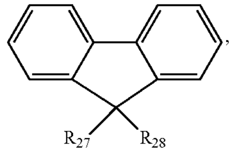

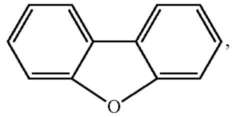

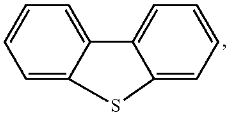

and mixtures thereof; wherein $R_{25}$, $R_{26}$, $R_{27}$, and $R_{28}$ are each independently —H or $—CH_3$; wherein p is 1 or 2; and wherein q is 0 or 1. An embodiment of the invention is one, any or all of prior embodiments in this paragraph up through the first embodiment in this paragraph wherein $Ar_2'$ is selected from the group consisting of

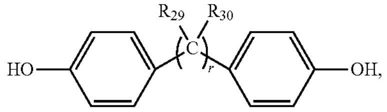

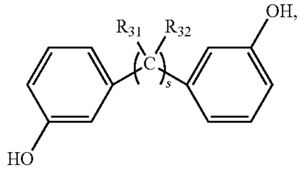

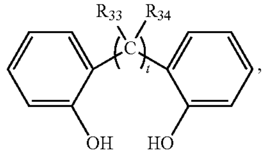

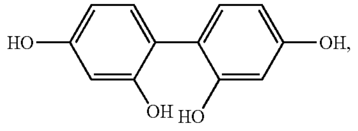

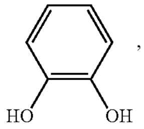

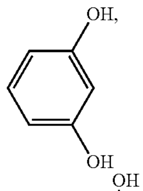

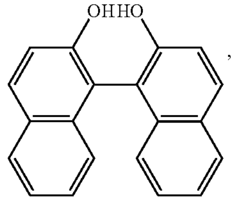

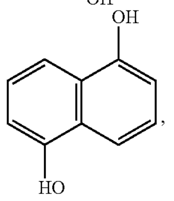

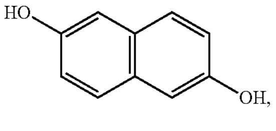

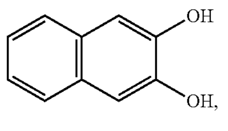

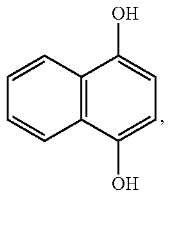

-continued

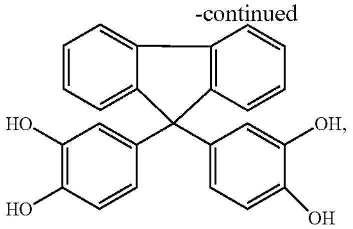

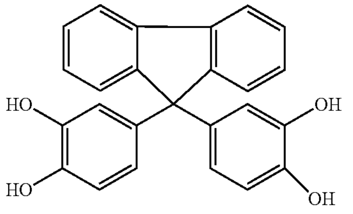

and mixtures thereof; wherein $R_{29}$, $R_{30}$, $R_{31}$, $R_{32}$, $R_{33}$, and $R_{34}$ are each independently —$CH_3$ or —$CF_3$; wherein r, s, and t are independent 0 or 1. An embodiment of the invention is one, any or all of prior embodiments in this paragraph up through the first embodiment in this paragraph wherein $X_1'$ is

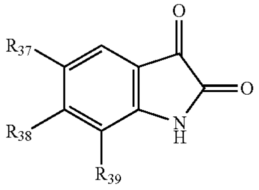

or a mixture of

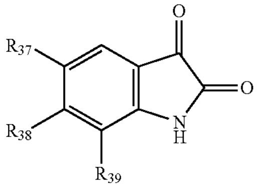

and

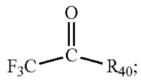

;

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{40}$ is —$CH_3$, —$CH_2CH_3$, or —$C_6H_5$.

A second embodiment of the invention is a proton-exchange membrane comprising the polymer of the first embodiment. An embodiment of the invention is one, any or all of prior embodiments in this paragraph up through the second embodiment in this paragraph wherein the proton-exchange membrane comprises a nonporous symmetric dense film membrane, an integrally-skinned asymmetric membrane, a reinforced composite membrane, or a thin film composite membrane. An embodiment of the invention is one, any or all of prior embodiments in this paragraph up through the second embodiment in this paragraph wherein the reinforced composite membrane or the thin film composite membrane comprises a porous substrate membrane impregnated or coated with the proton-conducting polymer.

A third embodiment of the invention is a membrane electrode assembly comprising a proton-exchange membrane comprising the polymer of the first embodiment; an anode comprising an anode catalyst on a first surface of the proton-exchange membrane; and a cathode comprising a cathode catalyst on a second surface of the proton-exchange membrane. An embodiment of the invention is one, any or all of prior embodiments in this paragraph up through the third embodiment in this paragraph further comprising an anode gas diffusion layer adjacent to the anode; and a cathode gas diffusion layer adjacent to the cathode.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A proton-conducting polymer comprising a plurality of repeating units of formula (I)

$$-\!(Ar_1-X_1)_n\!(Ar_2-X_1)_m\!- \qquad (I)$$

wherein one or more of $Ar_1$, $Ar_2$, and $X_1$ comprises an acid functional group, wherein the acid functional group comprises —$SO_3^-Z^+$, —$COO^-Z^+$, or —$PO_3H^-Z^+$, and wherein $Z^+$ is $H^+$, a metal cation, a quaternary ammonium cation, or mixtures thereof;

wherein $Ar_1$ is selected from the group consisting of:

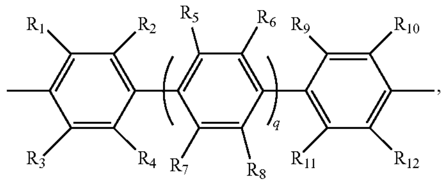

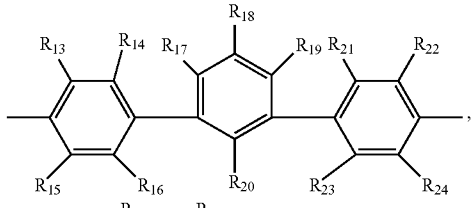

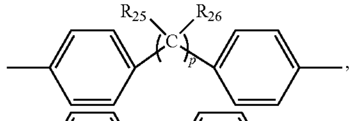

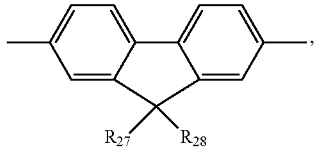

-continued
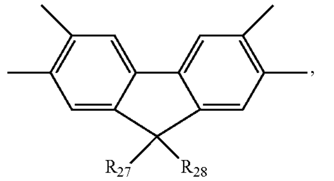
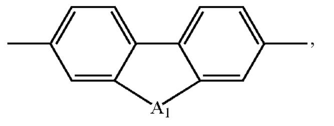
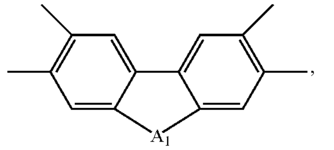
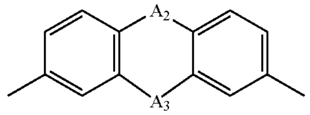
and mixtures thereof;
wherein $Ar_2$ is selected from the group consisting of:
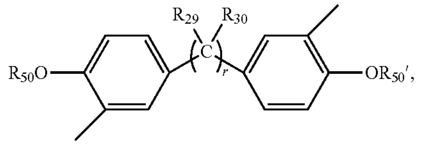
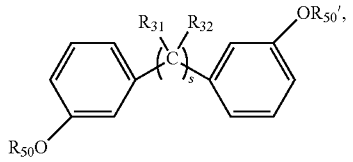
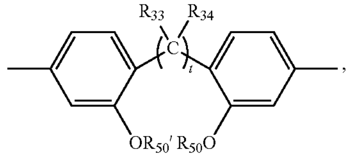
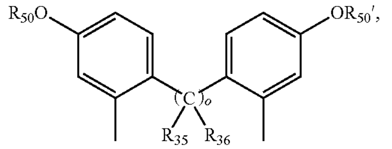
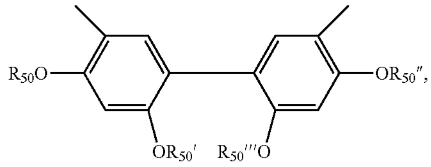
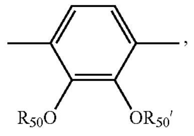
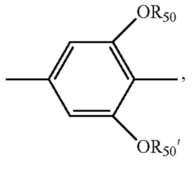
-continued
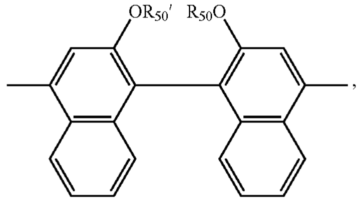
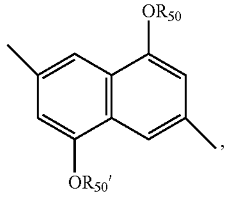
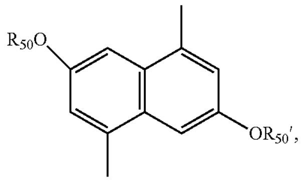
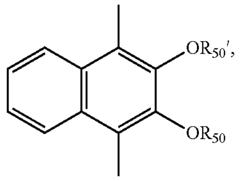
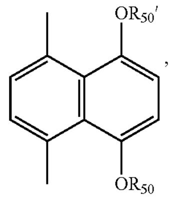
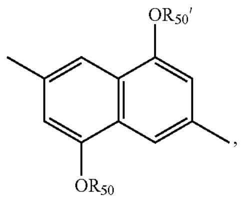
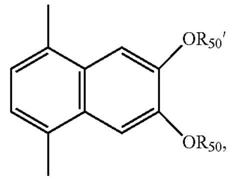
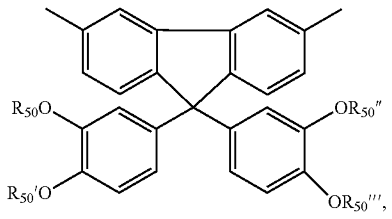
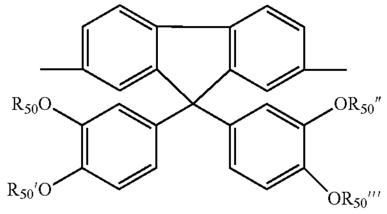
and mixtures thereof; and
wherein $X_1$ is selected from the group consisting of:
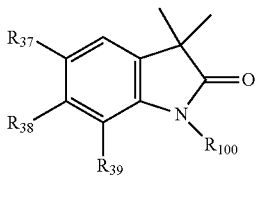

or a mixture of

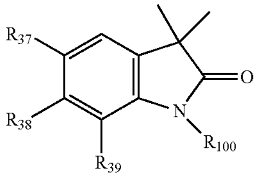

one or more of:

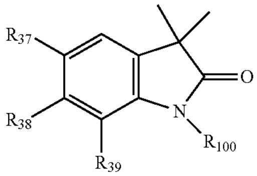 and 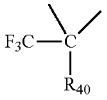

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_1^+$, —$COO^-Z_1^+$, or —$PO_3H^-Z_1^+$, and wherein $Z_1^+$ is $H^+$, a metal cation, a quaternary ammonium cation, or mixtures thereof;

wherein $R_{37}$-$R_{39}$ are each independently hydrogen, a halogen, a nitro group, an alkyl group, an alkenyl group, an alkynyl group, an aryl group, or an alkoxy group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_2^+$, —$COO^-Z_2^+$, or —$PO_3H^-Z_2^+$, and wherein $Z_2^+$ is $H^+$, a metal cation, a quaternary ammonium cation, or mixtures thereof;

wherein $R_{40}$ is an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_3^+$, —$COO^-Z_3^+$, or —$PO_3H^-Z_3^+$, and wherein $Z_3^+$ is $H^+$, a metal cation, a quaternary ammonium cation, or mixtures thereof;

wherein $R_{50}$, $R_{50}'$, $R_{50}''$, and $R_{50}'''$ are each independently hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group are substituted with an acid functional group or are substituted with a halogen and the acid functional group; wherein the acid functional group is —$SO_3^-Z_4^+$, —$COO^-Z_4^+$, or —$PO_3H^-Z_4^+$, and wherein $Z_4^+$ is $H^+$, a metal cation, a quaternary ammonium cation, or mixtures thereof; with the proviso that one or more of $R_{50}$ and $R_{50}'$ is not hydrogen, or one or more of $R_{50}$, $R_{50}'$, $R_{50}''$, and $R_{50}'''$ is not hydrogen;

wherein $R_{100}$ is independently a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group; wherein the acid functional group is —$SO_3^-Z_4^+$, —$COO^-Z_4^+$, or —$PO_3H^-Z_4^+$, and wherein $Z_4^+$ is $H^+$, a metal cation, a quaternary ammonium cation, or mixtures thereof;

wherein the halogen is F, Cl, Br, or I;

wherein $A_1$, $A_2$, and $A_3$ are each independently O, S, or N—$R_{200}$ and wherein $R_{200}$ is hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group;

wherein the acid functional group is —$SO_3^-Z_4^+$, —$COO^-Z_4^+$, or —$PO_3H^-Z_4^+$, and wherein $Z_4^+$ is $H^+$, a metal cation, a quaternary ammonium cation, or mixtures thereof;

wherein p is 1, 2, 3, or 4;

wherein q is 0, 1, 2, or 3;

wherein r, s, t, and o are independently 0, 1, 2, 3, 4, 5, or 6; and wherein n is an integer from 0 to 5000;

wherein m is an integer from 5 to 5000; and wherein a molar ratio of n/m is in a range of 0:1 to 20:1.

2. The polymer of claim 1 wherein $Ar_1$ is selected from the group consisting of

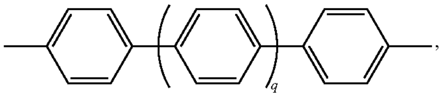,

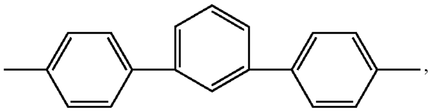,

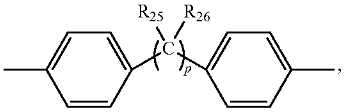,

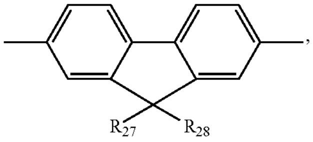,

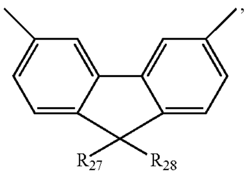,

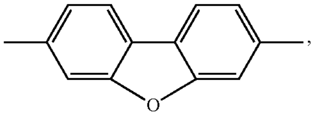,

-continued

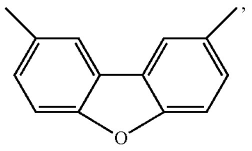

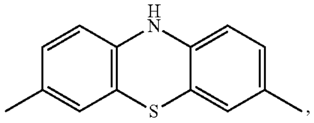

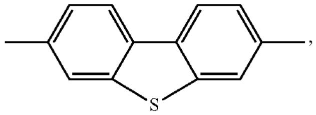

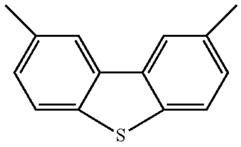

and mixtures thereof, wherein $R_{25}$, $R_{26}$, $R_{27}$, and $R_{28}$ are each independently —H or —$CH_3$;

wherein p is 1 or 2; and wherein q is 0 or 1.

3. The polymer of claim 1 wherein $Ar_2$ is selected from the group consisting of

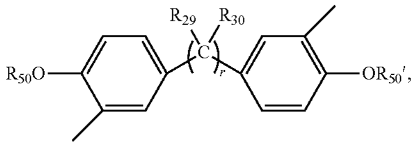

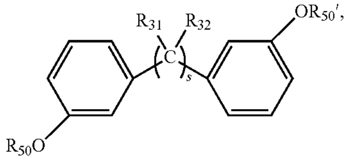

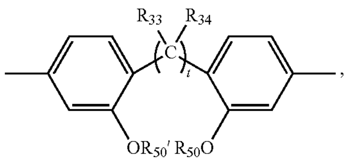

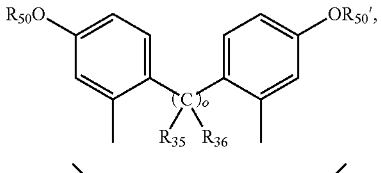

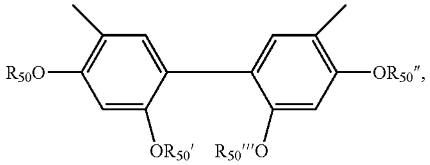

-continued

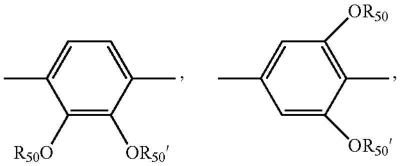

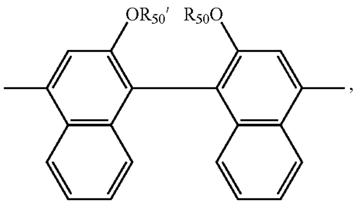

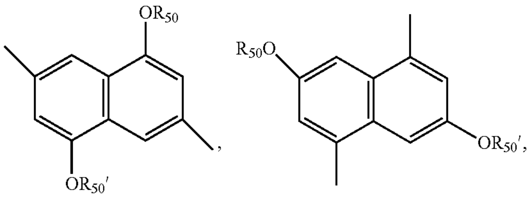

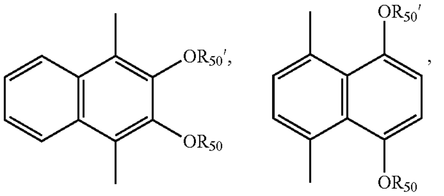

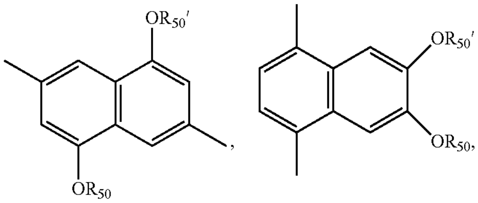

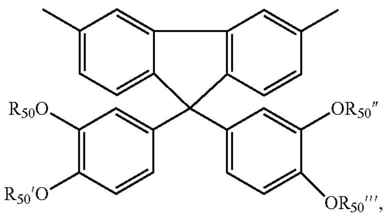

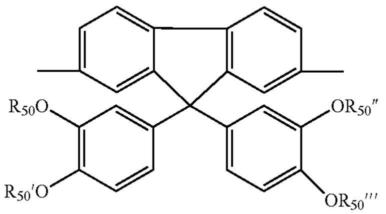

and mixtures thereof;

wherein $R_{29}$-$R_{36}$ are each independently —$CH_3$ or —$CF_3$;

wherein $R_{50}$, $R_{50}'$, $R_{50}''$, and $R_{50}'''$ are each independently hydrogen or —$(CH_2)_3SO_3^-Z_4^+$ and wherein $Z_4^+$ is $H^+$, a metal cation, a quaternary ammonium cation, or mixtures thereof, with the proviso that one or more of $R_{50}$ and $R_{50}'$ is not hydrogen, or one or more of $R_{50}$, $R_{50}'$, $R_{50}''$, and $R_{50}'''$ is not hydrogen; and wherein r, s, t, and o are each independently 0 or 1.

4. The polymer of claim 1 wherein $X_1$ is

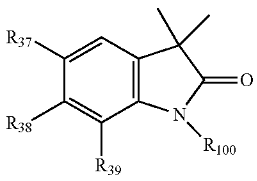

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{100}$ is —$(CH_2)_3SO_3^-Z_4^+$ and wherein $Z_4^+$ is $H^+$, a metal cation, a quaternary ammonium cation, or mixtures thereof.

5. The polymer of claim 1 wherein $X_1$ is a mixture of

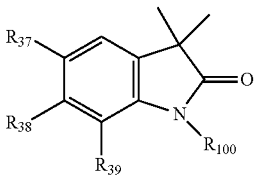

and

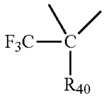

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$;

wherein $R_{40}$ is —$CH_3$, —$CH_2CH_3$, or —$C_6H_5$; and wherein $R_{100}$ is —$(CH_2)_3SO_3^-Z_4^+$ and wherein $Z_4^+$ is $H^+$, a metal cation, a quaternary ammonium cation, or mixtures thereof.

6. The polymer of claim 1 wherein $X_1$ is a mixture of

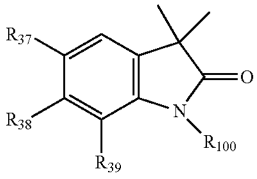

and

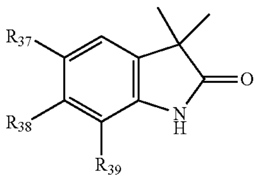

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{100}$ is —$(CH_2)_3SO_3^-Z_4^+$ and wherein $Z_4^+$ is $H^+$, a metal cation, a quaternary ammonium cation, or mixtures thereof.

7. The polymer of claim 1 wherein $X_1$ is a mixture of

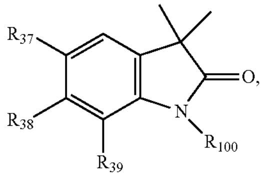

,

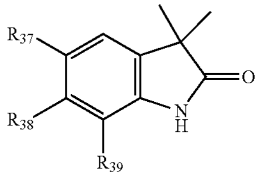

and

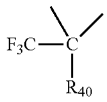

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$;

wherein $R_{40}$ is —$CH_3$, —$CH_2CH_3$, or —$C_6H_5$; and wherein $R_{100}$ is —$(CH_2)_3SO_3^-Z_4^+$ and wherein $Z_4^+$ is $H^+$, a metal cation, a quaternary ammonium cation, or mixtures thereof.

8. The polymer of claim 1 wherein $Ar_1$ is selected from the group consisting of

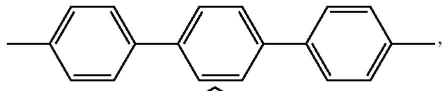

,

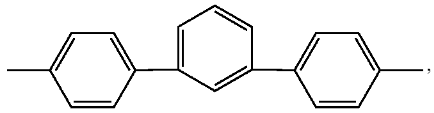

,

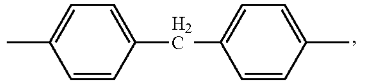

,

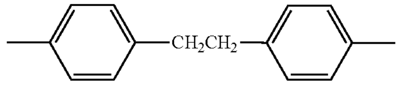

and mixtures thereof.

9. The polymer of claim 1 wherein $Ar_2$ is selected from the group consisting of:

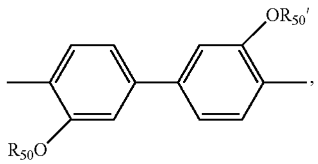

,

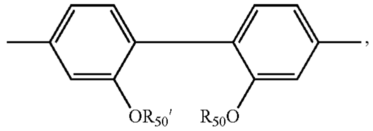

,

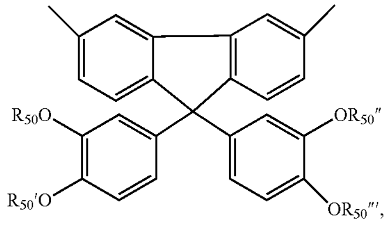

,

-continued

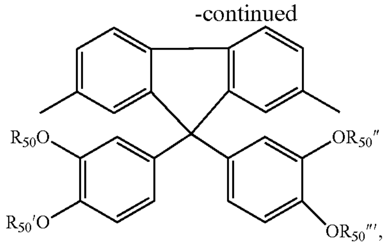

and mixtures thereof;

wherein $R_{50}$, $R_{50}'$, $R_{50}''$, and $R_{50}'''$ are each independently hydrogen or $—(CH_2)_3SO_3^-Z_4^+$ and wherein $Z_4^+$ is $H^+$, $Na^+$, $K^+$, $NH_4^+$, or mixtures thereof, with the proviso that one or more of $R_{50}$ and $R_{50}'$ is not hydrogen, or one or more of $R_{50}$, $R_{50}'$, $R_{50}''$, and $R_{50}'''$ is not hydrogen.

10. The polymer of claim 1 wherein $X_1$ is

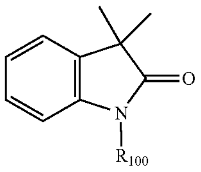

or a mixture of

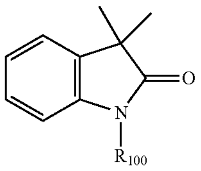

and one or more of:

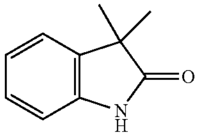

and

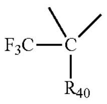

wherein $R_{100}$ is $—(CH_2)_3SO_3^-Z_4^+$ and wherein $Z_4^+$ is $H^+$, $Na^+$, $K^+$, $NH_4^+$, or mixtures thereof; and wherein $R_{40}$ is $—CH_3$, $—CH_2CH_3$, or $—C_6H_5$.

11. The polymer of claim 1 wherein the polymer comprises the reaction product of:

reacting monomers $Ar_1'$, $Ar_2'$, and $X_1'$ via a polyhydroxyalkylation reaction in the presence of a super acid catalyst to synthesize a precursor polymer comprising a plurality of repeating units of formula (II) having phenolic hydroxyl functional groups:

$$—(Ar_1—X_1'')_{n'}(Ar_2''—X_1'')_{m'}—; \quad \text{(II)}$$

wherein $Ar_1'$ is selected from the group consisting of:

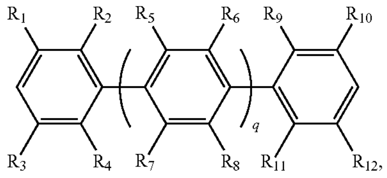

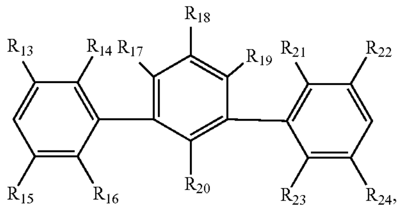

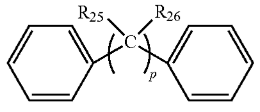

,

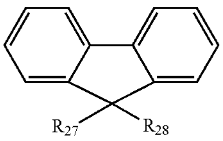

,

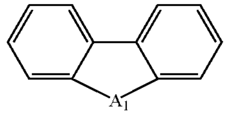

,

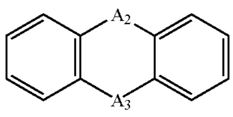

and mixtures thereof;

wherein $Ar_2'$ is selected from the group consisting of:

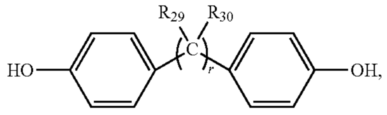

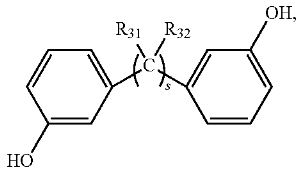

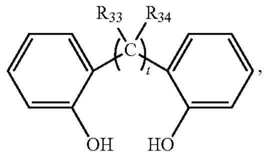

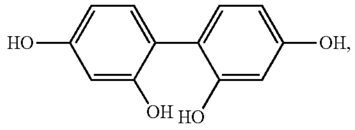

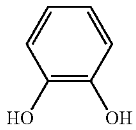

,

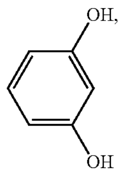

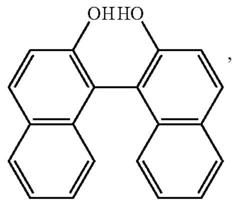

,

-continued
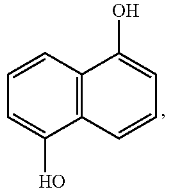
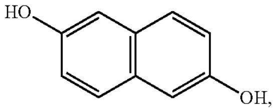
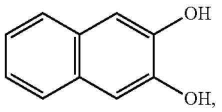
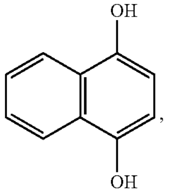
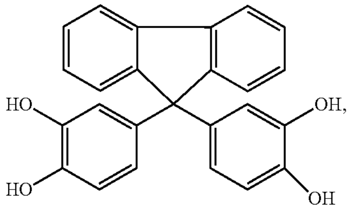
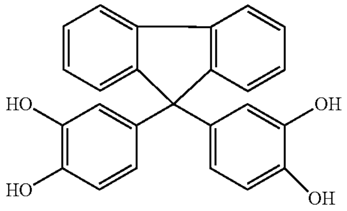
and mixtures thereof;
wherein $X_1'$ is
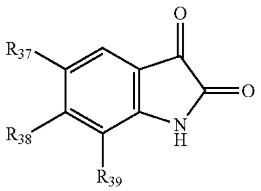
or a mixture of
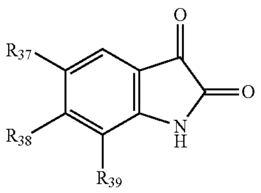
and
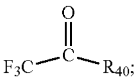
wherein $Ar_1$ is selected from the group consisting of:
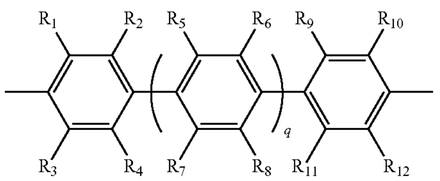
-continued
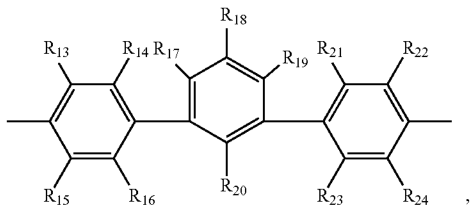
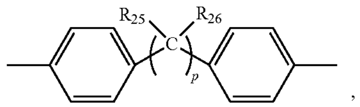
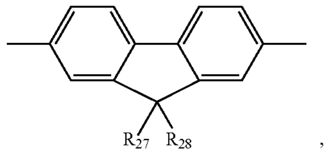
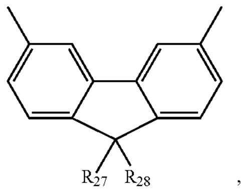
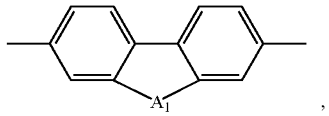
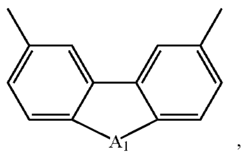
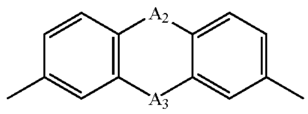
and mixtures thereof;
wherein $Ar_2''$ is selected from the group consisting of:
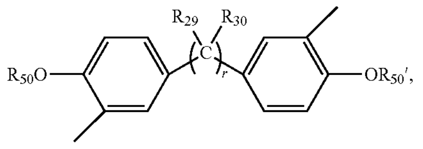
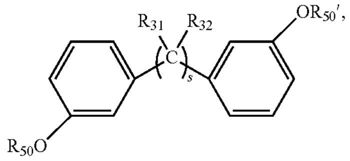
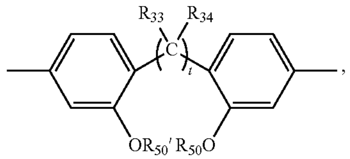

-continued

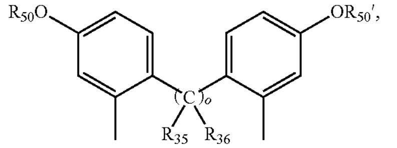

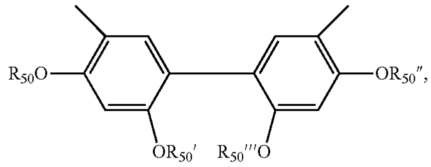

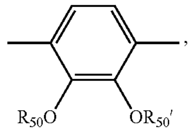

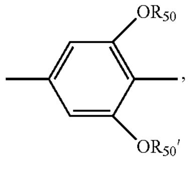

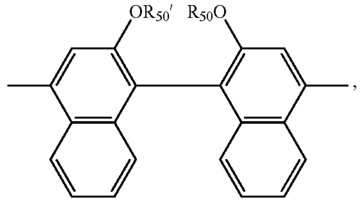

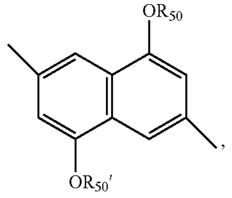

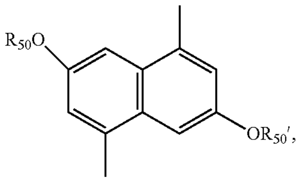

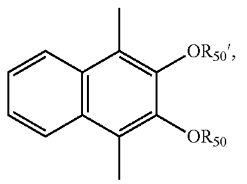

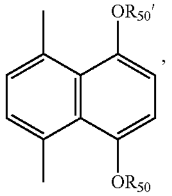

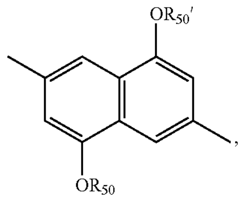

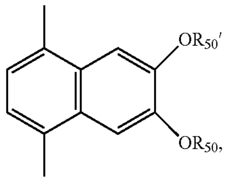

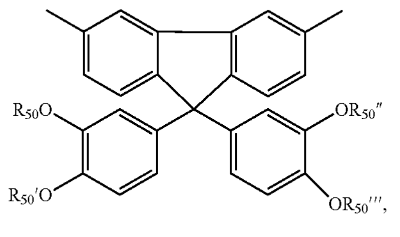

-continued

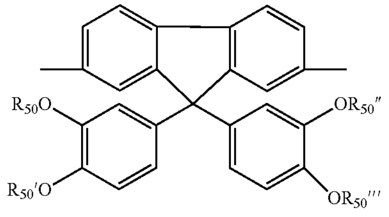

and mixtures thereof;

wherein $X_1$" is selected from the group consisting of:

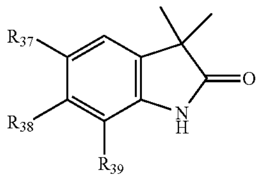

or a mixture of

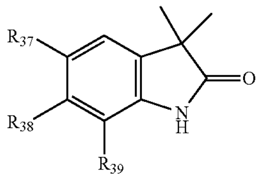

and

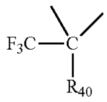

;

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen, an acid functional group, or both the halogen and the acid functional group, and wherein the acid functional group is $—SO_3^-Z_1^+$, $—COO^-Z_1^+$, or $—PO_3H^-Z_1^+$, and wherein $Z_1^+$ is $H^+$, a metal cation, a quaternary ammonium cation, or mixtures thereof;

wherein $R_{37}$-$R_{39}$ are each independently hydrogen, a halogen, a nitro group, an alkyl group, an alkenyl group, an alkynyl group, an aryl group, or an alkoxy group, and wherein the alkyl group, the alkenyl group, the alkynyl group, or the aryl group is optionally substituted with a halogen, an acid functional group, or both the halogen and the acid functional group, and wherein the acid functional group is $—SO_3^-Z_2^+$, $—COO^-Z_2^+$, or $—PO_3H^-Z_2^+$, and wherein $Z_2^+$ is $H^+$, a metal cation, a quaternary ammonium cation, or mixtures thereof;

wherein $R_{40}$ is an alkyl group, an alkenyl group, an alkynyl group, or an aryl group, and wherein the alkyl group, the alkenyl group, the alkynyl group, or the aryl group is optionally substituted with a halogen, an acid functional group, or both the halogen and the acid functional group, and wherein the acid functional group is $—SO_3^-Z_3^+$, $—COO^-Z_3^+$, or $—PO_3H^-Z_3^+$, and wherein $Z_3^+$ is $H^+$, a metal cation, a quaternary ammonium cation, or mixtures thereof;

wherein $A_1$, $A_2$, and $A_3$ are each independently O, S, or NH;

wherein p is 1, 2, 3, or 4;

wherein q is 0, 1, 2, or 3;

wherein r, s, t, and o are independently 0, 1, 2, 3, 4, 5, or 6; and wherein n' is an integer from 0 to 5000;

wherein m' is an integer from 5 to 5000; and wherein a molar ratio of n'/m' is in a range of 0:1 to 20:1; and reacting phenolic hydroxyl functional groups (—OH) on $Ar_2''$ and amide functional groups (—CONH—) on $X_1''$ on the precursor polymer with an electrophile via a nucleophilic substitution reaction or a grafting reaction, and optionally acidifying the polymer in an acid solution to form a proton-conducting polymer comprising a plurality of repeating units of formula (I)

$$-\!\left(Ar_1-X_1\right)_n\!\left(Ar_2-X_1\right)_m ; \qquad \text{(I)}$$

wherein $Ar_1$ is selected from the group consisting of:

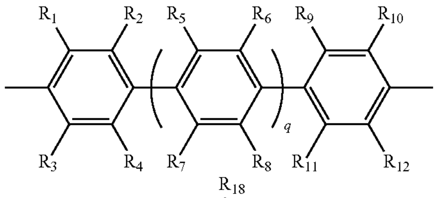

,

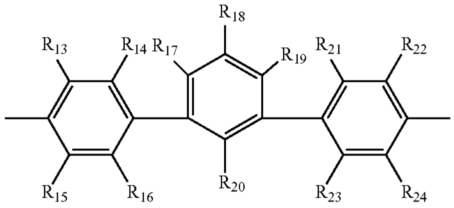

,

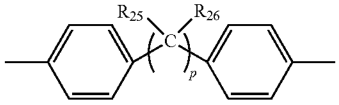

,

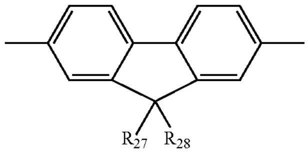

,

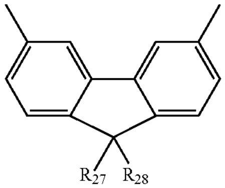

,

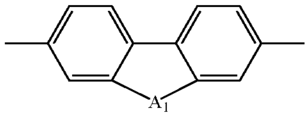

,

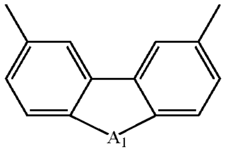

,

-continued

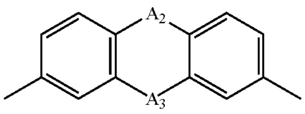

and mixtures thereof;

wherein $Ar_2$ is selected from the group consisting of:

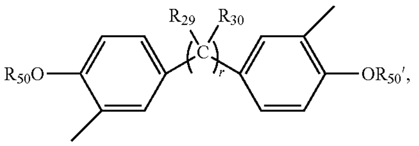

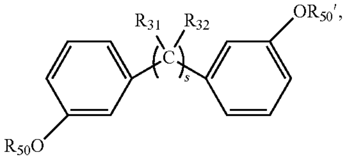

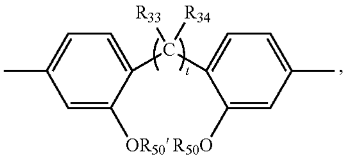

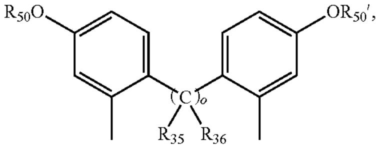

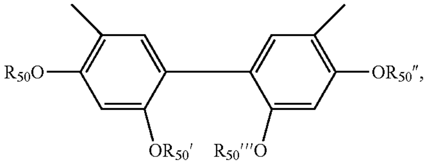

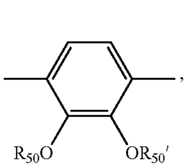

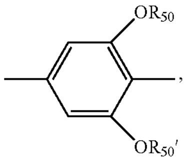

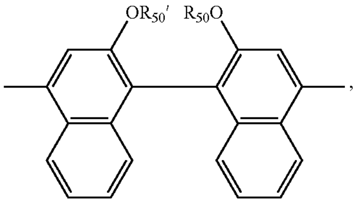

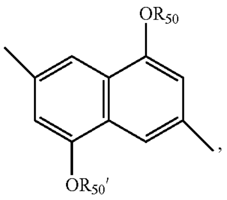

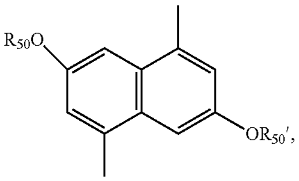

-continued

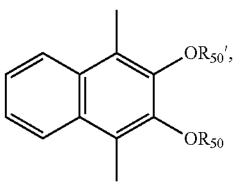

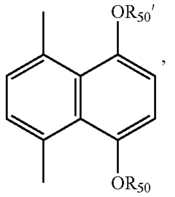

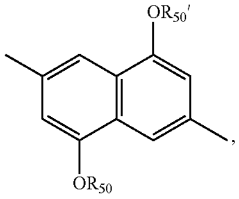

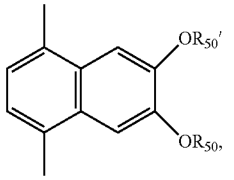

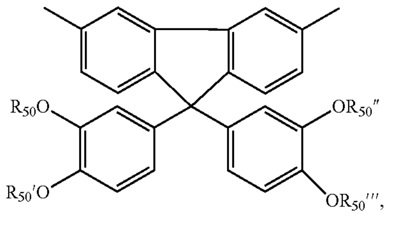

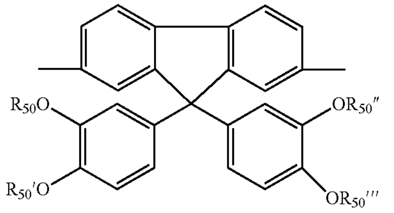

and mixtures thereof, and wherein $X_1$ is selected from the group consisting of:

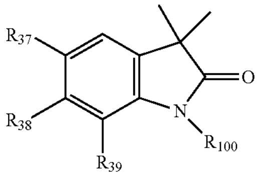

or a mixture of

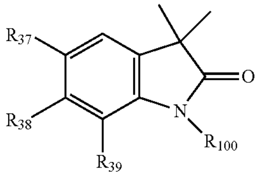

one or more of:

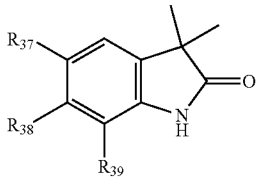

and

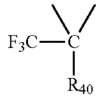

wherein $R_1$-$R_{36}$ are each independently hydrogen, a halogen, an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_1$, —$COO^-Z_1^+$, or —$PO_3H^-Z_1^+$, and wherein $Z_1^+$ is $H^+$, a metal cation, a quaternary ammonium cation, or mixtures thereof;

wherein $R_{37}$-$R_{39}$ are each independently hydrogen, a halogen, a nitro group, an alkyl group, an alkenyl group, an alkynyl group, an aryl group, or an alkoxy group, and wherein the alkyl group, the alkenyl group, the alkynyl group, or the aryl group is optionally substituted with a halogen, an acid functional group, or the halogen and the acid functional group, and wherein the acid functional group is —$SO_3^-Z_2^+$, —$COO^-$ $Z_2^+$, or —$PO_3H^-Z_2^+$, and wherein $Z_2^+$ is $H^+$, a metal cation, a quaternary ammonium cation, or mixtures thereof;

wherein $R_{40}$ is an alkyl group, an alkenyl group, an alkynyl group, or an aryl group, and wherein the alkyl group, the alkenyl group, the alkynyl group, or the aryl group is optionally substituted with a halogen, an acid functional group, or the halogen and the acid functional group, and wherein the acid functional group is —$SO_3^-$ $Z_3^+$, —$COO^-Z_3^+$, or —$PO_3H^-Z_3^+$, and wherein $Z_3^+$ is $H^+$, a metal cation, a quaternary ammonium cation, or mixtures thereof;

wherein $R_{50}$, $R_{50}'$, $R_{50}''$, and $R_{50}'''$ are each independently hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group are substituted with an acid functional group or are substituted with a halogen and the acid functional group; wherein the acid functional group is —$SO_3^-Z_4^+$, —$COO^-Z_4^+$, or —$PO_3H^-Z_4^+$, and wherein $Z_4^+$ is $H^+$, a metal cation, a quaternary ammonium cation, or mixtures thereof; with the proviso that one or more of $R_{50}$ and $R_{50}'$ is not hydrogen, or one or more of $R_{50}$, $R_{50}'$, $R_{50}''$, and $R_{50}'''$ is not hydrogen;

wherein $R_{100}$ is independently a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group; wherein the acid functional group is —$SO_3^-Z_4^+$, —$COO^-Z_4^+$, or —$PO_3H^-Z_4^+$, and wherein $Z_4^+$ is $H^+$, a metal cation, a quaternary ammonium cation, or mixtures thereof;

wherein the halogen is F, Cl, Br, or I;

wherein $A_1$, $A_2$, and $A_3$ are each independently O, S, or N—$R_{200}$ and wherein $R_{200}$ is hydrogen, a substituted alkyl group, a substituted alkenyl group, a substituted alkynyl group, or a substituted aryl group, and wherein the substituted alkyl group, the substituted alkenyl group, the substituted alkynyl group, or the substituted aryl group is substituted with an acid functional group or is substituted with a halogen and the acid functional group;

wherein the acid functional group is $-SO_3^-Z_4^+$, $-COO^-Z_4^+$, or $-PO_3H^-Z_4^+$, and wherein $Z_4^+$ is $H^+$, a metal cation, a quaternary ammonium cation, or mixtures thereof;

wherein p is 1, 2, 3, or 4;

wherein q is 0, 1, 2, or 3;

wherein r, s, t, and o are independently 0, 1, 2, 3, 4, 5, or 6; and wherein n is an integer from 0 to 5000;

wherein m is an integer from 5 to 5000; and wherein a molar ratio of n/m is in a range of 0:1 to 20:1.

12. The polymer of claim 11 wherein $Ar_1'$ is selected from the group consisting of:

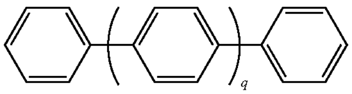
,
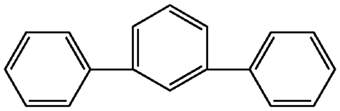
,
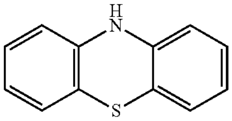
,
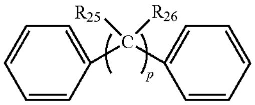
,
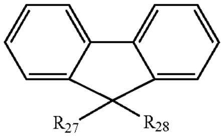
,
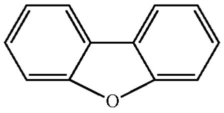
,
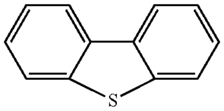

and mixtures thereof;

wherein $R_{25}$, $R_{26}$, $R_{27}$, and $R_{28}$ are each independently —H or $-CH_3$;

wherein p is 1 or 2; and wherein q is 0 or 1.

13. The polymer of claim 11 wherein $Ar_2'$ is selected from the group consisting of:

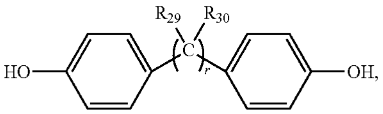

-continued

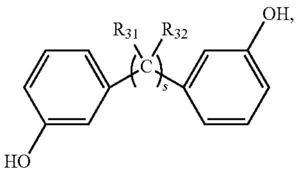
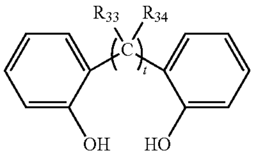
,
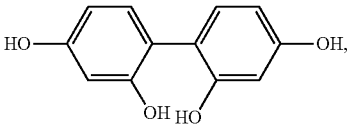
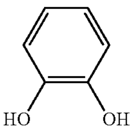
,
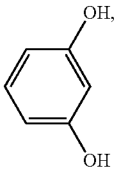
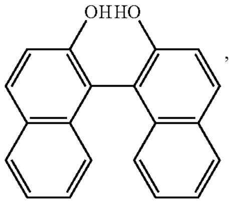
,
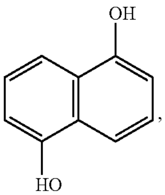
,
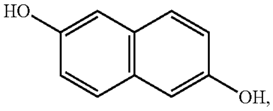
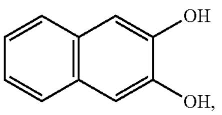
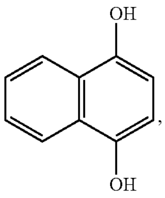
,
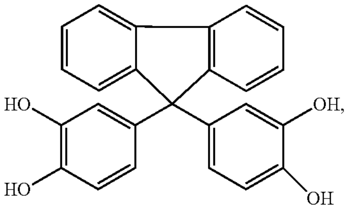
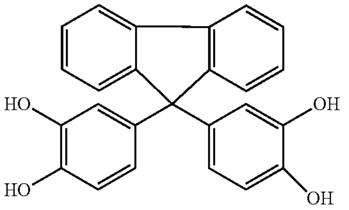

and mixtures thereof;

wherein $R_{29}$, $R_{30}$, $R_{31}$, $R_{32}$, $R_{33}$, and $R_{34}$ are each independently $-CH_3$ or $-CF_3$; and wherein r, s, and t are independent 0 or 1.

14. The polymer of claim 11 wherein $X_1'$ is

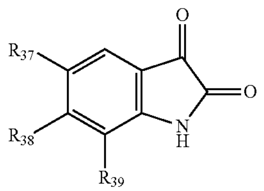

or a mixture of

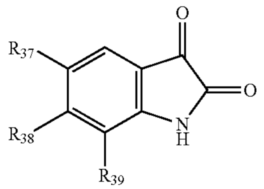

and

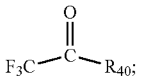

wherein $R_{37}$, $R_{38}$, and $R_{39}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $R_{40}$ is —$CH_3$, —$CH_2CH_3$, or —$C_6H_5$.

15. A proton-exchange membrane comprising the polymer of claim 1.

16. The proton-exchange membrane of claim 15 wherein the proton-exchange membrane comprises a nonporous symmetric dense film membrane, an integrally-skinned asymmetric membrane, a reinforced composite membrane, or a thin film composite membrane.

17. The proton-exchange membrane of claim 15 wherein the reinforced composite membrane or the thin film composite membrane comprises a porous substrate membrane impregnated or coated with the proton-conducting polymer.

18. A membrane electrode assembly comprising:

a proton-exchange membrane comprising the polymer of claim 1;

an anode comprising an anode catalyst on a first surface of the proton-exchange membrane; and a cathode comprising a cathode catalyst on a second surface of the proton-exchange membrane.

19. The membrane electrode assembly of claim 18 further comprising:

an anode gas diffusion layer adjacent to the anode; and a cathode gas diffusion layer adjacent to the cathode.

* * * * *